United States Patent
Watabe et al.

(10) Patent No.: US 12,297,862 B2
(45) Date of Patent: May 13, 2025

(54) DEEP-GROOVE BALL BEARING

(71) Applicant: NSK LTD., Tokyo (JP)

(72) Inventors: Eri Watabe, Kanagawa (JP); Hiroshi Ishiwada, Kanagawa (JP); Kento Takeuchi, Kanagawa (JP); Shigeki Maehara, Kanagawa (JP); Takashi Kuramochi, Kanagawa (JP); Ahmadfirdaus Binabdulhalim, Kanagawa (JP)

(73) Assignee: NSK LTD., Tokyo (JP)

( * ) Notice: Subject to any disclaimer, the term of this patent is extended or adjusted under 35 U.S.C. 154(b) by 51 days.

(21) Appl. No.: 18/273,477

(22) PCT Filed: Jan. 14, 2022

(86) PCT No.: PCT/JP2022/001237
§ 371 (c)(1),
(2) Date: Jul. 20, 2023

(87) PCT Pub. No.: WO2022/158401
PCT Pub. Date: Jul. 28, 2022

(65) Prior Publication Data
US 2024/0110595 A1    Apr. 4, 2024

(30) Foreign Application Priority Data

Jan. 22, 2021 (JP) .................................. 2021-008898
Jan. 22, 2021 (JP) .................................. 2021-008899
(Continued)

(51) Int. Cl.
*F16C 19/06* (2006.01)
*F16C 33/58* (2006.01)
(Continued)

(52) U.S. Cl.
CPC .............. *F16C 19/06* (2013.01); *F16C 33/58* (2013.01); *F16C 33/6607* (2013.01);
(Continued)

(58) Field of Classification Search
CPC .......... F16C 19/06; F16C 19/14; F16C 19/16; F16C 19/163; F16C 19/52; F16C 33/58;
(Continued)

(56) References Cited

U.S. PATENT DOCUMENTS

| | | | |
|---|---|---|---|
| 5,533,815 A * | 7/1996 | Schierling | F16C 33/783 |
| | | | 192/70.12 |
| 2002/0039460 A1* | 4/2002 | Nishimura | F16C 33/585 |
| | | | 384/516 |

(Continued)

FOREIGN PATENT DOCUMENTS

| | | | | |
|---|---|---|---|---|
| JP | 2007-107560 A | | 4/2007 | |
| JP | 2007092861 A | * | 4/2007 | F16C 33/782 |

(Continued)

OTHER PUBLICATIONS

Machine Translation of JP-2007092861-A (Year: 2007).*

(Continued)

Primary Examiner — Alan B Waits
(74) Attorney, Agent, or Firm — Sughrue Mion, PLLC

(57) ABSTRACT

A deep groove ball bearing includes an outer ring, an inner ring, a plurality of balls, and a seal member. An axial cross-sectional width is smaller than a radial cross-sectional height, a thickness of the inner ring is greater than a thickness of the outer ring, and a pitch diameter of the ball is larger than a median diameter between an inner diameter of the inner ring and an outer diameter of the outer ring A radial dimension between an outer diameter of a shoulder portion of the inner ring and an inner diameter of the seal member is greater than the thickness of the outer ring. As a (Continued)

result, width and weight can be reduced, a load capacity can be secured, grease leakage can be prevented, and a service lifespan can be extended.

10 Claims, 18 Drawing Sheets

(30) Foreign Application Priority Data

| | | | |
|---|---|---|---|
| Jan. 22, 2021 | (JP) | ................................. | 2021-008900 |
| Jan. 22, 2021 | (JP) | ................................. | 2021-008901 |
| Jan. 22, 2021 | (JP) | ................................. | 2021-008902 |
| Jan. 22, 2021 | (JP) | ................................. | 2021-008903 |

(51) Int. Cl.
    *F16C 33/66*     (2006.01)
    *F16C 33/78*     (2006.01)
    *F16C 33/80*     (2006.01)

(52) U.S. Cl.
    CPC ........ *F16C 33/6633* (2013.01); *F16C 33/785* (2013.01); *F16C 33/7856* (2013.01); *F16C 33/805* (2013.01)

(58) Field of Classification Search
    CPC ............... F16C 33/583; F16C 33/6603; F16C 33/6607; F16C 33/6618; F16C 33/6633; F16C 33/7806; F16C 33/782; F16C 33/7823; F16C 33/7826; F16C 33/784; F16C 33/7843; F16C 33/7846; F16C 33/785; F16C 33/7853; F16C 33/7856; F16C 33/7886; F16C 33/80
    See application file for complete search history.

(56) References Cited

U.S. PATENT DOCUMENTS

| | | |
|---|---|---|
| 2006/0153484 A1 | 7/2006 | Ohata et al. |
| 2016/0153505 A1 | 6/2016 | Nakayama |
| 2018/0045247 A1* | 2/2018 | Inamasu ............. F16C 33/7856 |

FOREIGN PATENT DOCUMENTS

| | | |
|---|---|---|
| JP | 2011-208731 A | 10/2011 |
| JP | 2012-13116 A | 1/2012 |
| WO | 2004/007983 A1 | 1/2004 |
| WO | 2015/015976 A1 | 2/2015 |

OTHER PUBLICATIONS

International Search Report (PCT/ISA/210) dated Mar. 29, 2022, issued by the International Searching Authority in counterpart International Application No. PCT/JP2022/001237.

Written Opinion (PCT/ISA/237) dated Mar. 29, 2022, issued by the International Searching Authority in counterpart International Application No. PCT/JP2022/001237.

* cited by examiner

DEEP-GROOVE BALL BEARING

CROSS-REFERENCE TO RELATED APPLICATIONS

This application is a National Phase Entry of PCT International Application No. PCT/JP2022/001237 filed on Jan. 14, 2022, which claims priority to Japanese Patent Application No. 2021-008898 filed on Jan. 22, 2021, Japanese Patent Application No. 2021-008899 filed on Jan. 22, 2021, Japanese Patent Application No. 2021-008900 filed on Jan. 22, 2021, Japanese Patent Application No. 2021-008901 filed on Jan. 22, 2021, Japanese Patent Application No. 2021-008902 filed on Jan. 22, 2021, and Japanese Patent Application No. 2021-008903 filed on Jan. 22, 2021, the contents of all of which are incorporated herein by reference in their entirety.

TECHNICAL FIELD

The present invention relates to a deep groove ball bearing.

BACKGROUND ART

Rotation shafts of home appliance motors such as air conditioner fans, cooling fans, ventilation fans, cleaners, and washing machines, industrial motors such as general-purpose motors, servomotors, stepping motors, and machine tool spindles and encoders are rotatably supported by rolling bearings. For such rolling bearings, deep groove ball bearings are often used because deep groove ball bearings can support axial loads in both directions in addition to a radial load, and have low friction torque, making the deep groove ball bearings suitable for parts that rotate at high speeds and applications that require low noise and low vibration. A deep groove ball bearing has an arc-shaped deep groove on a raceway, has seal members attached on both sides in an axial direction, and has grease enclosed in a bearing space.

As a single-row ball bearing used in a motor for a washing machine or the like, a deep groove ball bearing is known in which a thickness of an inner ring is made 1.5 times or more a thickness of an outer ring to increase rigidity of the inner ring and prevent occurrence of creep in the inner ring (see Patent Literature 1, for example).

CITATION LIST

Patent Literature

Patent Literature 1: JP2012-13116A

SUMMARY OF INVENTION

Technical Problem

By the way, in an encoder, position information is read using a disk with a slit. As a width of the slit is becoming narrower year by year, contamination of the disk may cause reading errors. In a deep groove ball bearing, which is a rolling bearing used in an encoder and the like, preventing grease leakage and dust generation is required, and further improvements are required.

The single-row ball bearing described in Patent Literature 1 includes a seal member that is disposed in contactless proximity with a seal groove provided in an inner ring, but no consideration is given to preventing grease leakage or generated dust.

Motors and the like are required to be smaller and lighter, and the rolling bearings used are also required to be narrower.

The present invention is made in view of the problems described above, and an object is to provide a deep groove ball bearing that is narrower and lighter, ensures a load capacity, prevents grease leakage, and extends a lifespan of the bearing.

Solution to Problem

The object described above of the present invention is achieved by the following configurations.

A deep groove ball bearing that includes:
an outer ring with an outer ring raceway groove on an inner diameter surface;
an inner ring with an inner ring raceway groove on an outer diameter surface;
a plurality of balls rollably arranged between the outer ring raceway groove and the inner ring raceway groove; and
a seal member fixed to the outer ring and disposed in contact or non-contact with a seal groove formed in a shoulder portion of the inner ring to seal a space between the outer ring and the inner ring, where
an axial cross-sectional width is smaller than a radial cross-sectional height,
a thickness of the inner ring is greater than a thickness of the outer ring,
a pitch diameter of the ball is larger than a median diameter between an inner diameter of the inner ring and an outer diameter of the outer ring, and
a radial dimension between an outer diameter of a shoulder portion of the inner ring and an inner diameter of the seal member is greater than the thickness of the outer ring.

Advantageous Effects of Invention

According to the deep groove ball bearing of the present invention, by making the axial cross-sectional width smaller than the radial cross-sectional height, width and weight can be reduced. The thickness of the inner ring is greater than the thickness of the outer ring, and the pitch diameter of the ball is greater than the median diameter between the inner diameter of the inner ring and the outer diameter of the outer ring, so the number of balls can be increased. Therefore, a load capacity of the deep groove ball bearing can be secured, and a service lifespan can be extended.

The radial dimension between the outer diameter of the shoulder portion of the inner ring and the inner diameter of the seal member is greater than the thickness of the outer ring, so it is possible to effectively prevent grease leakage and prolong the service lifespan of the deep groove ball bearing.

DESCRIPTION OF EMBODIMENTS

Hereinafter, an embodiment and modification examples of a deep groove ball bearing according to the present invention will be described in detail based on the drawings.

Figure 1:
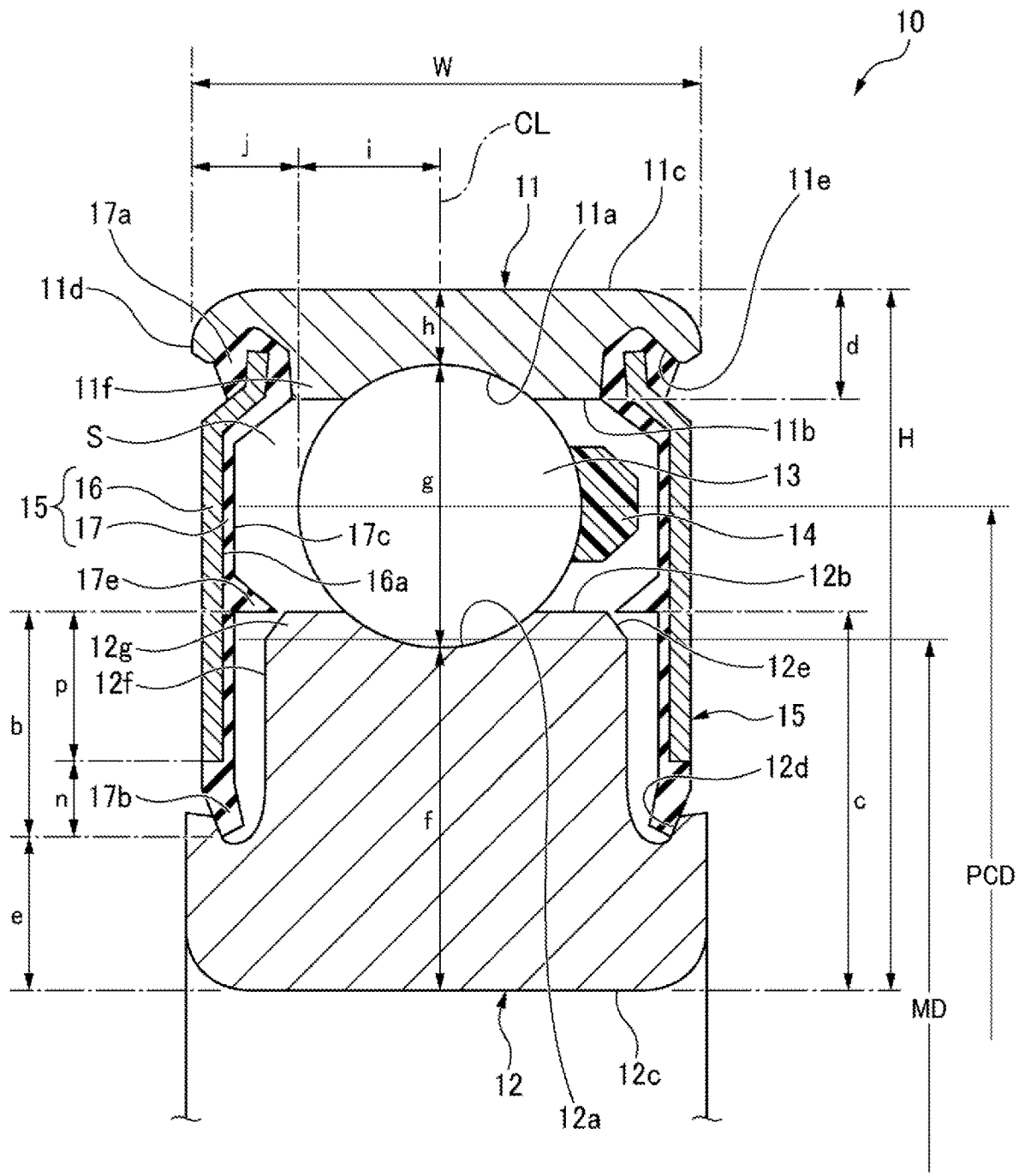
FIG. 1 is a cross-sectional view of an essential part of a deep groove ball bearing according to an embodiment of the present invention.

As illustrated in FIG. 1, a deep groove ball bearing 10 of the present embodiment includes an outer ring 11 having an outer ring raceway groove 11a on an inner diameter surface thereof, an inner ring 12 having an inner ring raceway groove 12a on an outer diameter surface thereof, a plurality of balls 13 arranged rollably between the outer ring raceway groove 11a and the inner ring raceway groove 12a, a crown-shaped retainer 14 made of resin that retains the balls 13 at predetermined intervals in a circumferential direction, and a pair of seal members 15 fixed to both sides in an axial direction of the inner diameter surface of the outer ring 11 to seal a bearing space S between the outer ring 11 and the inner ring 12. Grease is enclosed in the bearing space S in advance. Although the grease is not illustrated in FIG. 1, a symbol G in FIG. 16 indicates the grease.

In the present embodiment, the outer ring raceway groove 11a and the inner ring raceway groove 12a are formed in the outer ring 11 and the inner ring 12 so that an axial centerline CL of the ball 13 is located at an axial middle position of the deep groove ball bearing 10.

The seal member 15 includes a metal core 16 formed of a metal plate such as a steel plate in a substantially annular shape, and a seal portion 17 made of an elastic material such as rubber fixed to the metal core 16.

The seal portion 17 includes an outer peripheral edge portion 17a formed to cover an outer peripheral edge of the metal core 16 and protrude radially outward, a lip portion 17b having an annular shape extending radially inward from an inner peripheral edge of the metal core 16, and a side portion 17c fixed to an inner side surface 16a of the metal core 16 and connecting the outer peripheral edge portion 17a and the lip portion 17b. That is, the metal core 16 is disposed axially outside the seal portion 17 while the seal member 15 is attached to the deep groove ball bearing 10. As a result, even when oil content of the grease soaked into the elastic material of the seal portion 17 oozes out, the metal core 16 can prevent the oil content from leaking outward in the axial direction.

The outer peripheral edge portion 17a is engaged with a seal attachment groove 11e formed in an axial end portion of the outer ring 11 by press fitting or the like, thereby fixing the seal member 15 to the outer ring 11.

The lip portion 17b is in sliding contact with a seal groove 12d formed in a shoulder portion 12g of the inner ring 12 from an axial inner side, and the seal member 15 forms a contact seal. An auxiliary lip portion 17e is formed in a radially intermediate portion of the side portion 17c to protrude inward in the axial direction. The auxiliary lip portion 17e is disposed close to an edge portion 12e between an outer diameter surface 12b of the shoulder portion 12g of the inner ring 12 and a side surface 12f of the seal groove 12d without contact. In the present embodiment, the edge portion 12e is chamfered.

Accordingly, the seal member 15 of the present embodiment seals the bearing space S between the outer ring 11 and the inner ring 12 from the outside by the lip portion 17b and the auxiliary lip portion 17e.

Here, in the deep groove ball bearing 10 of the present embodiment, an axial cross-sectional width (that is, an axial width of the outer ring 11 and the inner ring 12) W is smaller than a radial cross-sectional height (that is, a radial distance between an outer diameter of the outer ring 11 and an inner diameter of the inner ring 12) H (W<H) As a result, the width and weight of the deep groove ball bearing 10 can be reduced, and a shaft (not illustrated) fitted to the inner ring 12 can be shortened.

In the present embodiment, a space sealed by the seal member 15 in the deep groove ball bearing 10, that is, the bearing space S surrounded by the seal member 15, the inner ring 12, the outer ring 11, and the ball 13 is enclosed with low dust generation grease. Since the low dust generation grease contains an appropriately selected base oil, a thickener, and an additive, an amount of dust generation from the deep groove ball bearing 10 can be reduced. In particular, when the deep groove ball bearing 10 is used for a rotation shaft of a servomotor, contamination of an encoder can be prevented.

The low dust generation grease used in the present embodiment contains a base oil blended with at least one selected from a synthetic hydrocarbon oil and an ether oil, a thickener composed of a urea compound, and an additive consisting only of a non-metallic element, and an amount of metal elements mixed is 30 ppm or less. The low dust generation grease will be described in more detail.

The base oil contained in the low dust generation grease is desirably a synthetic oil having excellent lubricating performance and torque performance, and includes at least one of a synthetic hydrocarbon oil and an ether oil having excellent low dust generation performance. Examples of the synthetic hydrocarbon oil include a poly-α-olefin oil, and examples of the ether oil include a dialkyldiphenyl ether oil, an alkyltriphenyl ether oil, and an alkyltetraphenyl ether oil.

Considering high-temperature durability in particular, it is desirable to use alkyldiphenyl ether as an essential component (50% by weight or more of the base oil component). From a viewpoint of low-temperature fluidity, it is most desirable to use a synthetic hydrocarbon oil as the base oil.

To further improve lubricating properties, an ester oil may be blended if necessary. A polyol ester oil and an aromatic ester oil are desirable as the ester oil to be blended. Considering the dust generating properties, this ester oil is desirably less than 50% by weight of the base oil component.

Kinematic viscosity of the base oil is preferably 30 mm$^2$/s to 180 mm$^2$/s, more preferably 30 mm$^2$/s to 150 mm$^2$/s. It is possible to prevent evaporation at high temperatures by setting the kinematic viscosity of the base oil to 30 mm$^2$/sec or more, and an increase in friction torque and an increase in the amount of dust generated can be prevented by setting the kinematic viscosity of the base oil to 180 mm$^2$/sec or less.

The low-dust generation grease contains a thickener composed of a urea compound that acts to improve high-temperature properties. Urea compounds include diurea, triurea, tetraurea, polyurea, and the like. The urea compounds may contain other elements other than metal elements in molecules, and may have substituents containing no metal atoms.

The content of the urea compound in the grease is not particularly limited as long as a grease form can be formed, and is preferably in a range of approximately 10% by weight to 30% by weight. The urea compound has an effect of improving the high-temperature properties of the grease, particularly mechanical stability at high temperatures, and the effect can be sufficiently obtained by making it 10% by weight or more. On the other hand, by setting the amount to 30% by weight or less, it is possible to reduce the amount of dust generated and prevent an increase in torque and deterioration of lubricating performance. To reduce the amount of dust generated, appropriate hardness is required. Therefore, it is preferable to set the worked penetration of the grease to 190 to 230.

The low dust generation grease contains an additive, and the additive consists only of non-metallic elements. Kinds of additives and preferred compounds thereof are exemplified below. Preferred compounds are compounds containing no sulfur, chlorine, or phosphorus. As for the additive, it is preferable to add a rust inhibitor to meet the requirements for rust prevention. If necessary, an antioxidant, an oiliness agent, a metal deactivator, or the like can be added. Examples of additives that can be used in the present invention are shown below.

Carboxylic acids such as succinic acid and derivatives thereof, and nonionic surfactants such as sorbitan can be used as rust preventives. Amine-based or phenol-based antioxidants can be used as antioxidants, long-chain fatty acid-based oily agents can be used as oily agents, and benzotriazole-based metal deactivators can be used as metal deactivators.

Each of the additives described above is used alone or in combination as appropriate.

An amount of the additives to be added is preferably 0.1% by weight or more of the total amount of the grease as a single additive, so that the effects of the additives can be obtained. However, when used alone or in combination, the total amount is desirably 1% by weight or less of the total amount of grease, thereby preventing a rapid increase in the amount of dust generated.

The grease used in the present invention is obtained by, according to the method of the related art, blending the above-described base oil with predetermined amounts of thickeners and additives and kneading the mixture with a kneader.

During kneading, the grease may contain metals from a kneader, a transport container, or the like. Metal elements may be contained as impurities in raw materials. However, when sufficient control is performed during processing, an amount of contamination can be reduced to a very small amount, which does not impair the effects of the present invention. Therefore, it is most desirable that an amount of metal elements mixed in the grease is below a detection limit of an analyzer, and preferably below 30 ppm. However, Li, Na, Al, Ca, Ni, Zn, Mo, Sn, Sb, Ba, and Pb are preferably 5 ppm or less considering the technical field of the present invention. For the same reason, Cl, P, and S are preferably 20 ppm or less.

Figure 3:
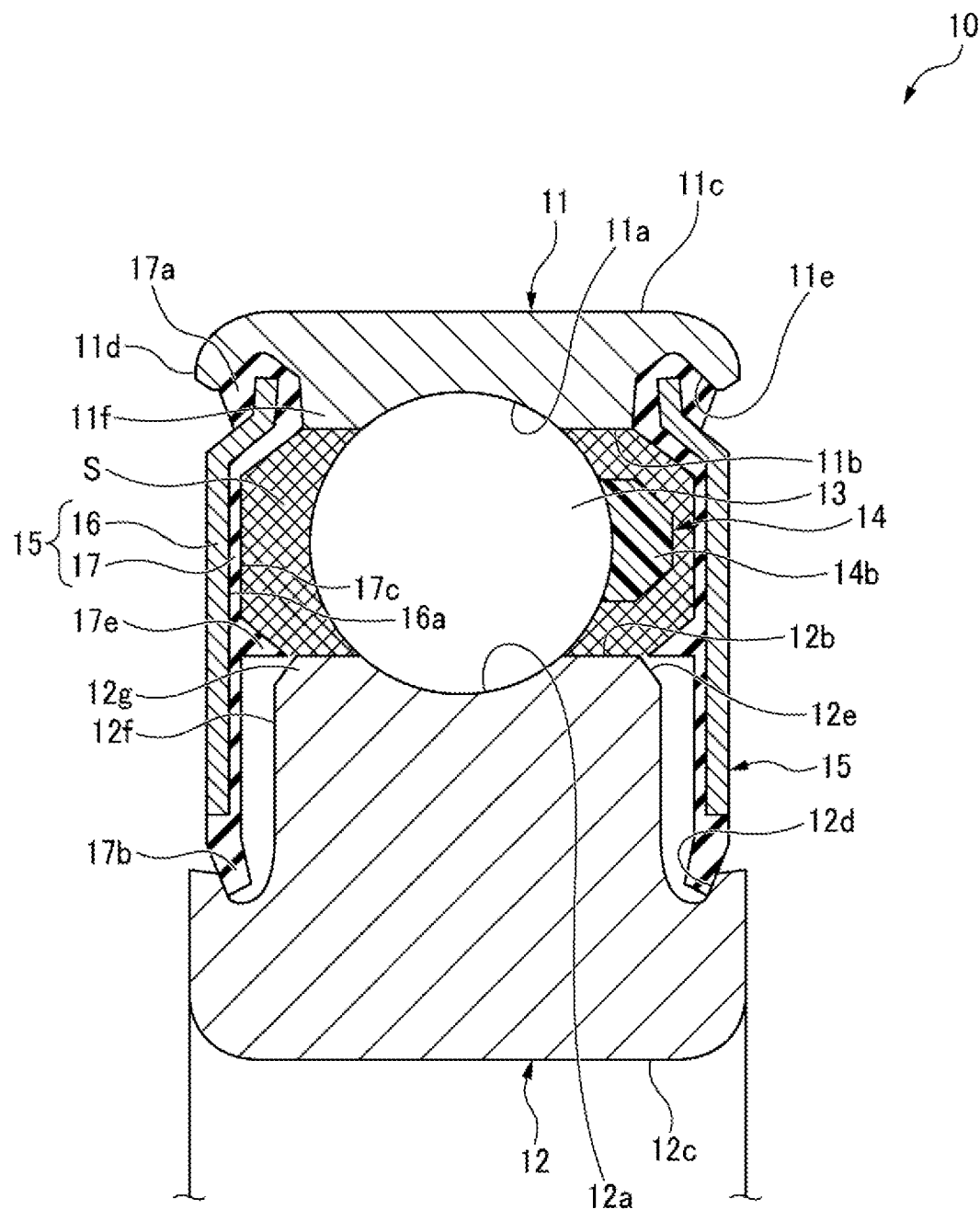
FIG. 3 is a cross-sectional view of an essential part illustrating a space volume of a bearing space.

An amount of grease enclosed in the bearing space S is set to 15% to 25% of a space volume. Here, as illustrated by the hatched lines in FIG. 3, the space volume means the volume of the space surrounded by an inner peripheral surface of the outer ring 11, an outer peripheral surface of the inner ring 12, and the pair of seal members 15 minus the volume of the ball 13 and the retainer 14.

When the amount of enclosed grease is less than 15% of the space volume, the grease does not spread over the raceway surface, the base oil of the grease cannot efficiently lubricate, and the grease is consumed quickly. As a result, grease lifespan and bearing lifespan may be shortened. On the other hand, when the amount of grease enclosed exceeds 25% of the space volume, there is a possibility that dust generation and leakage of the grease will increase. Therefore, the amount of enclosed grease is 15% to 25% of the space volume of the bearing space S.

A thickness c of the inner ring 12 is set larger than a thickness d of the outer ring 11 (c>d). Since the thickness c of the inner ring 12 is greater than the thickness d of the outer ring 11, a pitch diameter PCD of the ball 13 is greater than a median diameter MD between the inner diameter of the inner ring 12 and the outer diameter of the outer ring 11. That is, when the outer diameter and inner diameter of the bearing 10 are the same size, by increasing the thickness c of the inner ring 12, the pitch diameter PCD is increased compared to a standard deep groove ball bearing in which the thicknesses of the outer ring 11 and the inner ring 12 are the same. Therefore, the number of balls 13 can be increased, so a load capacity can be increased, and a service lifespan can be extended. By increasing the number of balls 13, the deep groove ball bearing 10 can increase a load capacity even when the balls 13 having a small diameter g are used to reduce the axial cross-sectional width W described above.

The thickness c of the inner ring 12 is a radial dimension between the outer diameter surface 12b of the shoulder portion 12g of the inner ring 12 and an inner diameter surface 12c of the inner ring 12, and the thickness d of the outer ring 11 is a radial dimension between an inner diameter surface 11b of the shoulder portion 11f of the outer ring 11 and the outer diameter surface 11c of the outer ring 11.

A radial dimension b between an outer diameter of the shoulder portion 12g of the inner ring 12 and an inner diameter of the seal member 15 is set larger than the thickness d of the outer ring 11 (b>d). As a result, an overlapping dimension in a radial direction between the side surface 12f of the seal groove 12d of the inner ring 12 and the seal member 15 is increased. That is, a labyrinth gap formed between the side surface 12f of the seal groove 12d and the side portion 17c of the seal portion 17 is long in the radial direction between the lip portion 17b and the auxiliary lip portion 17e, thereby preventing grease leakage. Since the radial cross-sectional height H is secured, the overlapping dimension in the radial direction of the inner ring and the seal member can be easily secured.

The radial dimension b between the outer diameter of the inner ring 12 and the inner diameter of the seal member 15 is larger than a radial dimension e between the inner diameter of the inner ring 12 and the inner diameter of the seal member 15 (b>e). Therefore, the labyrinth gap that is long in the radial direction can be easily formed.

When a radial dimension between the outer diameter of the inner ring raceway groove 12a and the inner diameter of the inner ring 12 is f, a diameter of the ball 13 is g, and a radial dimension between the inner diameter of the outer ring raceway groove 11a and the outer diameter of the outer ring 11 is h, a relationship between the dimensions is f>g>h. As a result, inertia of a shaft (not illustrated) fitted to the inner ring 12 can be reduced.

A radius i (=g/2) of the ball 13 is larger than an axial dimension j between an axial end surface of the ball 13 and an axial end surface 11d of the outer ring 11 (i>j), so the ball 13 with a larger diameter is used. Therefore, when the axial length is the same, the load capacity is increased compared to a standard deep groove ball bearing, making it possible to extend the service lifespan.

Figure 2:
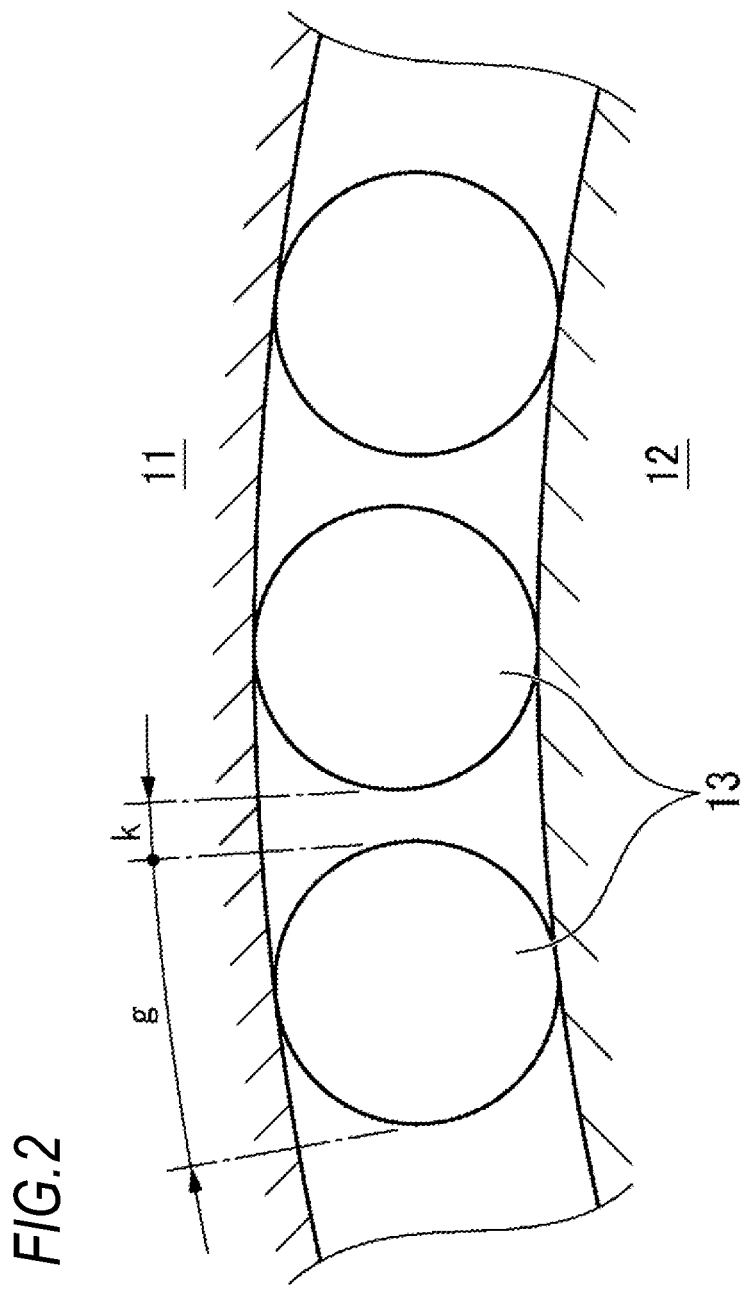
FIG. 2 is an explanatory view illustrating an interval between balls in the deep groove ball bearing of FIG. 1.

Referring to FIG. 2, the diameter g of the ball 13 is made larger than a circumferential interval k between the adjacent balls 13 (g>k) so that more balls 13 are arranged. Therefore, a load received by each ball 13 is dispersed and becomes smaller than that of a ball with a diameter smaller than the circumferential interval k between the adjacent balls 13 (g<k), so the service lifespan of each ball 13 can be extended.

A radial dimension p between the outer diameter of the shoulder portion 12g of the inner ring 12 and the inner diameter of the metal core 16 of the seal member 15 is greater than a radial dimension n between the inner diameter of the metal core 16 of the seal member 15 and the inner diameter of the seal member 15 (p>n). Therefore, deformation of the seal member 15 when the seal member 15 is attached to the deep groove ball bearing 10 is prevented, and thus grease leakage can be further reduced.

As described above, in the deep groove ball bearing 10 of the present embodiment, the axial cross-sectional width W is made smaller than the radial cross-sectional height H (W<H), so that the width and weight can be reduced. The above-described configuration is given by the fact that the thickness c of the inner ring 12 is greater than the thickness d of the outer ring 11. Since the pitch diameter PCD of the ball 13 is larger than the median diameter MD between the inner diameter of the inner ring 12 and the outer diameter of the outer ring 11, the number of balls can be increased, so the load capacity of the deep groove ball bearing can be secured and the service lifespan can be extended.

Since the radial dimension b between the outer diameter of the shoulder portion 12g of the inner ring 12 and the inner diameter of the seal member 15 is set larger than the thickness d of the outer ring 11 (b>d), an overlapping dimension in the radial direction between the side surface 12f of the seal groove 12d of the inner ring 12 and the seal member 15 increases, that is, the labyrinth gap formed between the side surface of the seal member 15 and the side surface 12f of the seal groove 12d is lengthened, thereby preventing leakage of enclosed grease.

Since the radial dimension b between the outer diameter of the shoulder portion 12g of the inner ring 12 and the inner diameter of the seal member 15 is greater than the radial dimension e between the inner diameter of the inner ring 12 and the inner diameter of the seal member 15 (b>e), grease leakage is further prevented.

By increasing the thickness c of the inner ring 12 compared to the thickness d of the outer ring 11 (c>d), the radial length of the side surface 12f of the seal groove 12d of the inner ring 12 can be increased, so the labyrinth performance is improved and grease leakage is further prevented.

Since the bearing space S sealed by the seal member 15 is enclosed with a predetermined low dust generation grease, generation of dust can be prevented. Since the low dust generation grease contains a small amount of metal elements, it is possible to reduce scattering of metal elements. The preferred low dust generation grease is excellent in fluidity, lubricity, and high temperature properties, and has even more excellent low dust generation properties, so the deep groove ball bearing 10 having excellent mechanical stability and torque performance at high temperatures can be obtained, and contamination to the surroundings can be reduced.

Hereinafter, deep groove ball bearings according to modification examples of the present invention will be described with reference to the drawings. In the description of the deep groove ball bearings of the modification examples, mainly the parts different from those of the above-described embodiment will be described, and the same reference numerals or equivalent reference numerals and letters are given to the similar portions as those of the above-described embodiment, including the dimensional relationship, and the description thereof will be simplified or omitted.

First Modification Example

Figure 4:
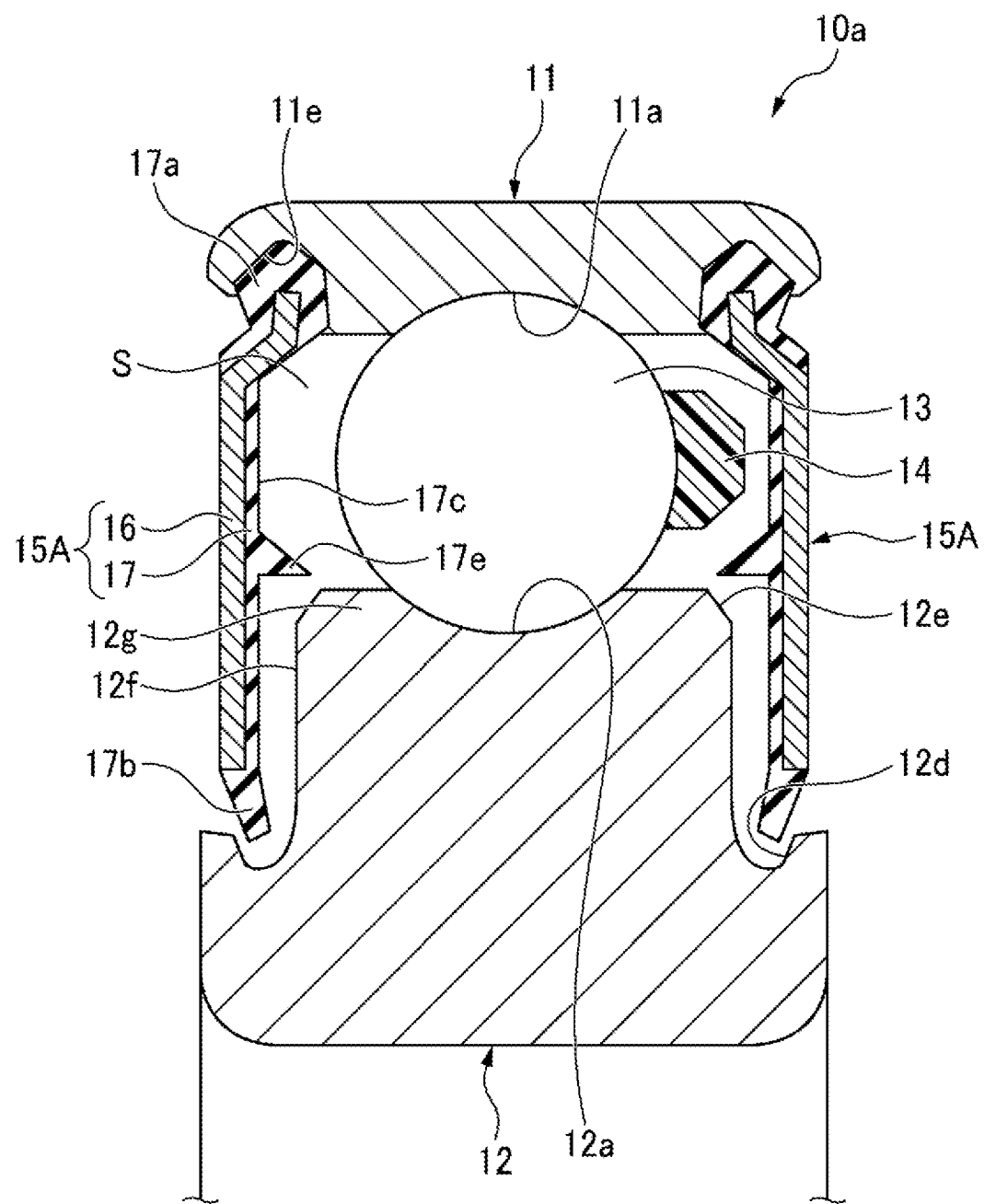
FIG. 4 is a cross-sectional view of an essential part of a deep groove ball bearing according to a first modification example.

As illustrated in FIG. 4, in a deep groove ball bearing 10a of a first modification example, the lip portion 17b of a seal member 15A forms a non-contact seal that does not come into contact with the seal groove 12d. Therefore, by making both the lip portion 17b and the auxiliary lip portion 17e non-contact seals, the rotational torque can be reduced. Use of the non-contact seal is disadvantageous in terms of grease leakage, but since the labyrinth gap is long, grease leakage is less than in the case of the related art.

Second Modification Example

Figure 5:
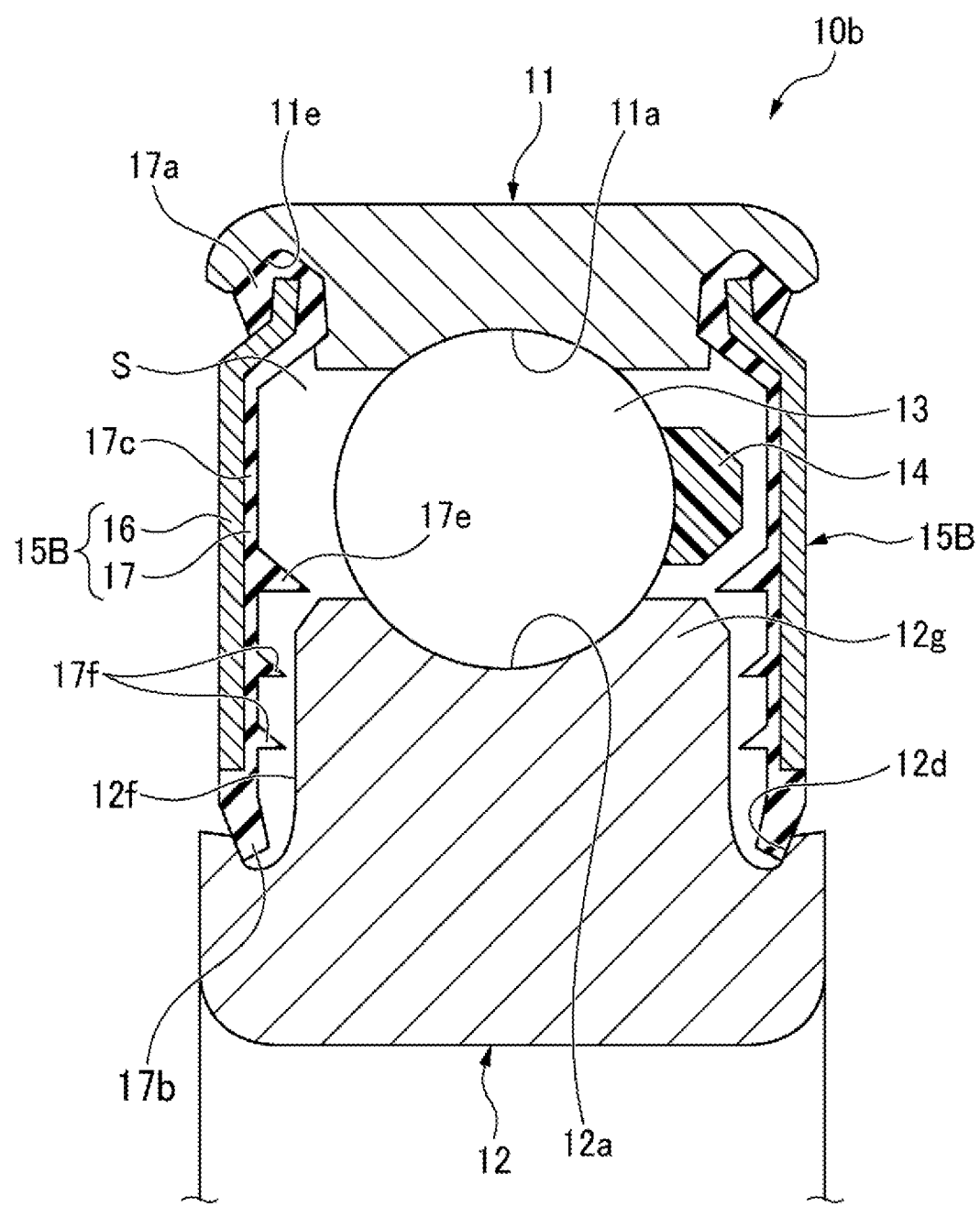
FIG. 5 is a cross-sectional view of an essential part of a deep groove ball bearing according to a second modification example.

As illustrated in FIG. 5, in a deep groove ball bearing 10b of a second modification example, a seal member 15B has a plurality of other auxiliary lip portions 17f that are not in contact with the side surface 12f of the seal groove 12d between the lip portion 17b and the auxiliary lip portion 17e. Thereby, sealing performance of the seal member 15B can be further improved.

Third Modification Example

Figure 6:
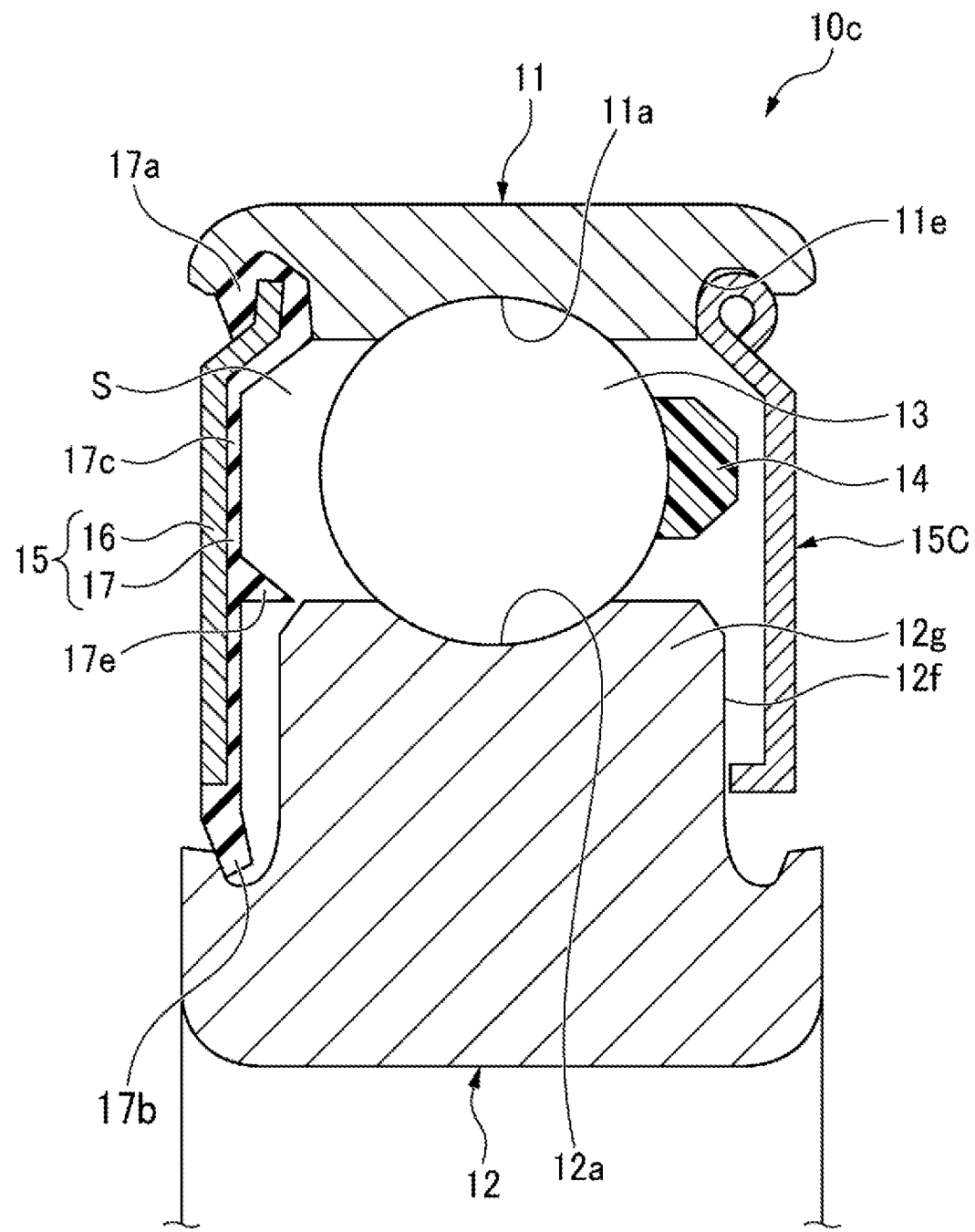
FIG. 6 is a cross-sectional view of an essential part of a deep groove ball bearing according to a third modification example.

As illustrated in FIG. 6, in a deep groove ball bearing 10c of a third modification example, a seal member 15C (metal shield) is fixed to the seal attachment groove 11e on one side in the axial direction, preferably on a closing side of the retainer where grease hardly leaks. Therefore, by using the seal member 15C that is not in contact with the inner ring 12 on one side in the axial direction, rotational torque can be reduced and cost can be reduced.

Fourth Modification Example

Figure 7:
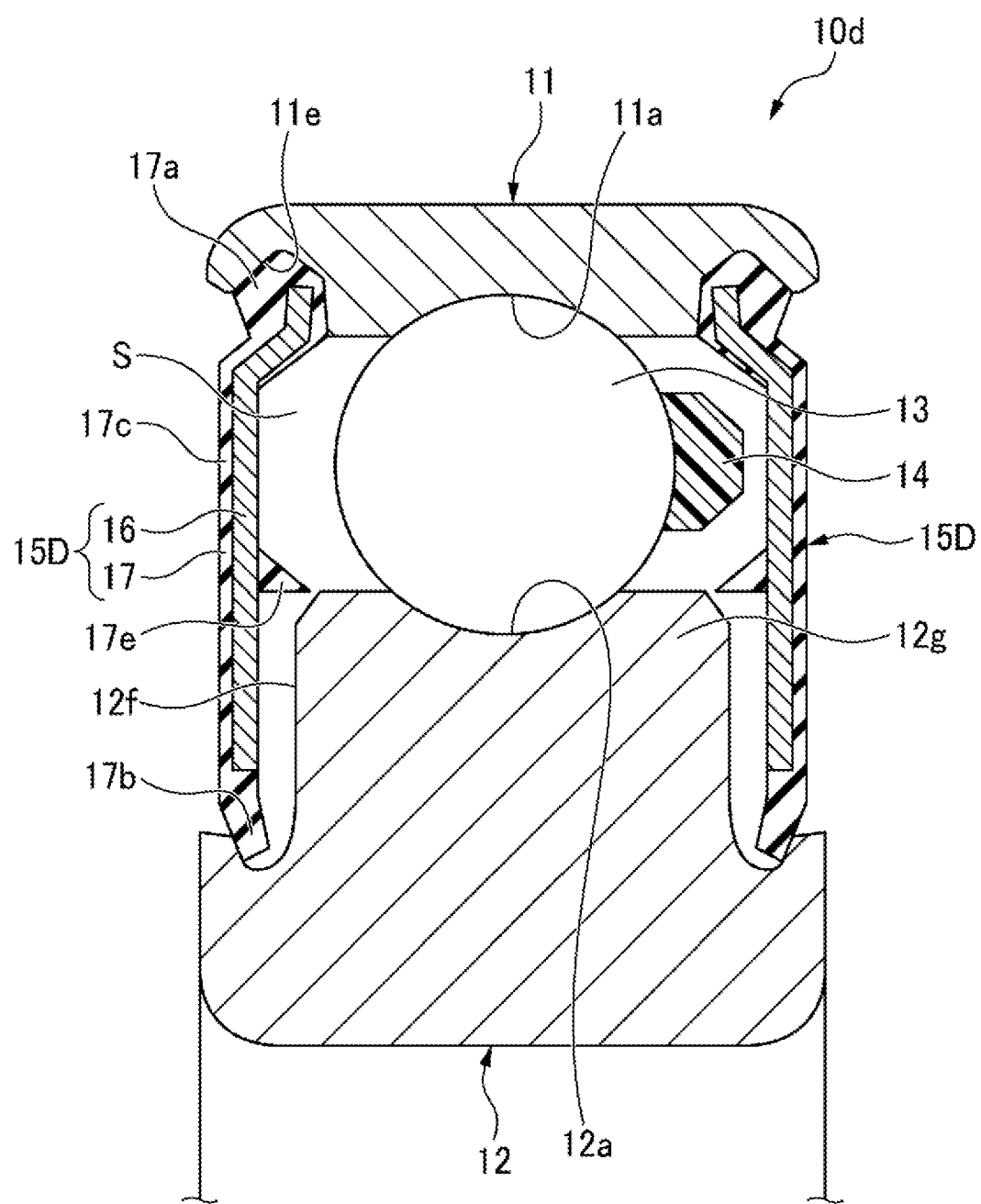
FIG. 7 is a cross-sectional view of an essential part of a deep groove ball bearing according to a fourth modification example.

As illustrated in FIG. 7, in a deep groove ball bearing 10d of a fourth modification example, the metal core 16 of a seal member 15D is disposed inside the seal portion 17 in the axial direction. Here, the seal member 15D may include the auxiliary lip portion 17e joined to the metal core 16 separately, or may not include the auxiliary lip portion 17e. Such configuration makes it difficult for the lip portion 17b to be separated from the metal core 16.

Fifth Modification Example

Figure 8:
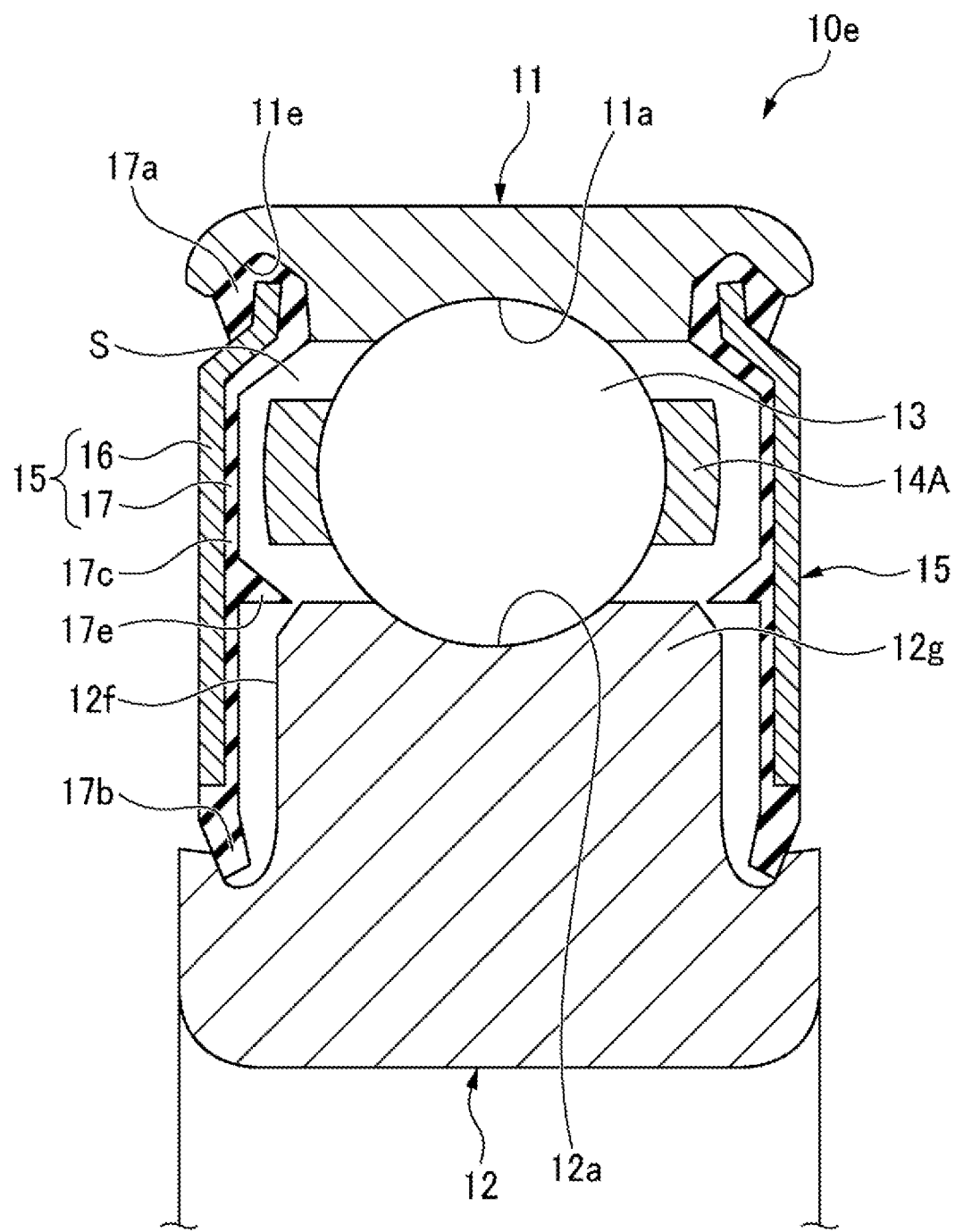
FIG. 8 is a cross-sectional view of an essential part of a deep groove ball bearing according to a fifth modification example.

As illustrated in FIG. 8, in a deep groove ball bearing 10e of a fifth modification example, a retainer 14A made of steel is used instead of the retainer 14 made of resin. Durability of the retainer 14A is improved and a lifespan of the deep groove ball bearing 10e is prolonged.

Sixth Modification Example

Figure 9:
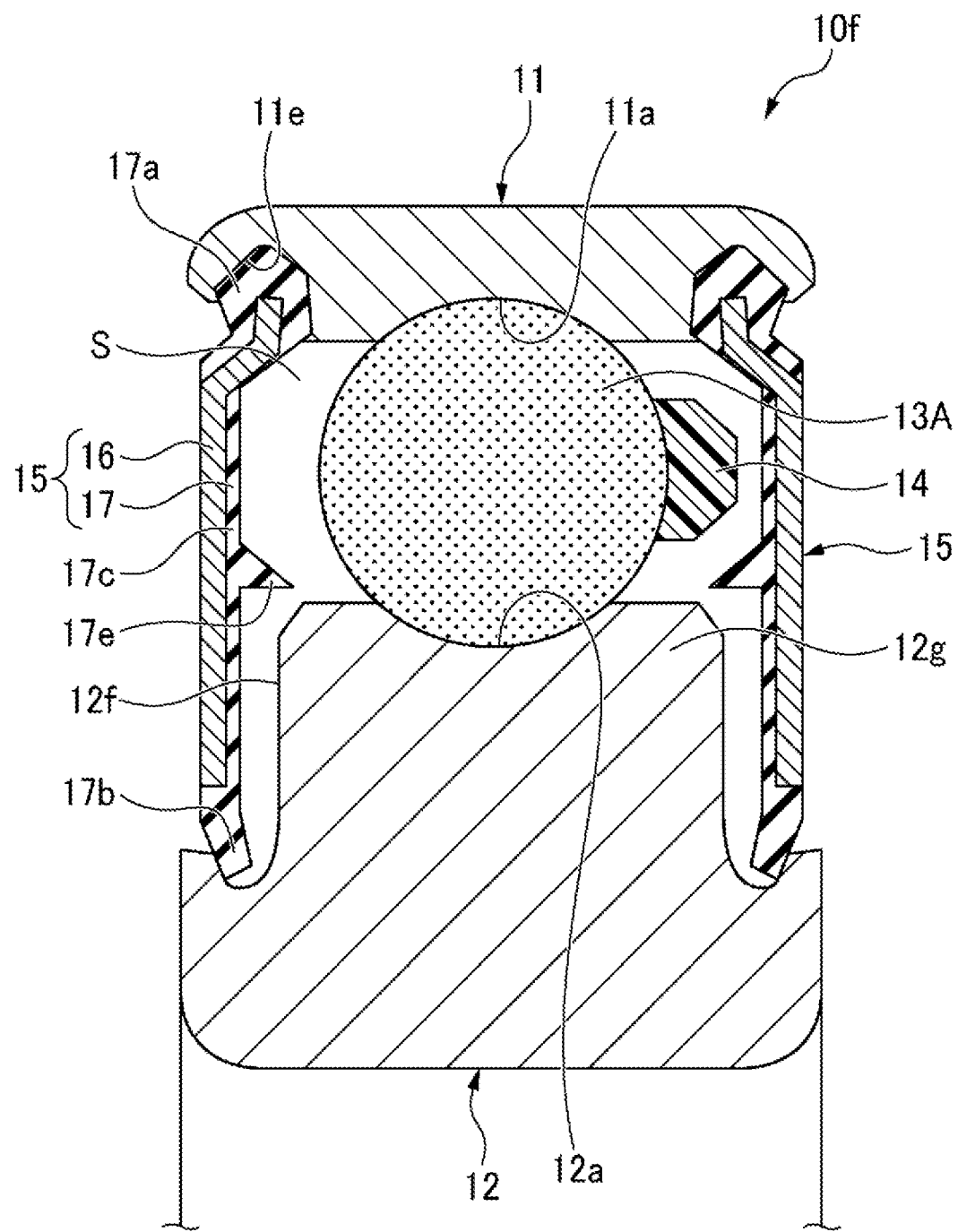
FIG. 9 is a cross-sectional view of an essential part of a deep groove ball bearing according to a sixth modification example.

As illustrated in FIG. 9, in a deep groove ball bearing 10f of a sixth modification example, a ball 13A made of ceramic is used instead of the ball 13 made of steel, thereby extending a lifespan of the ball 13A and preventing electrolytic corrosion.

Seventh Modification Example

Figure 10:
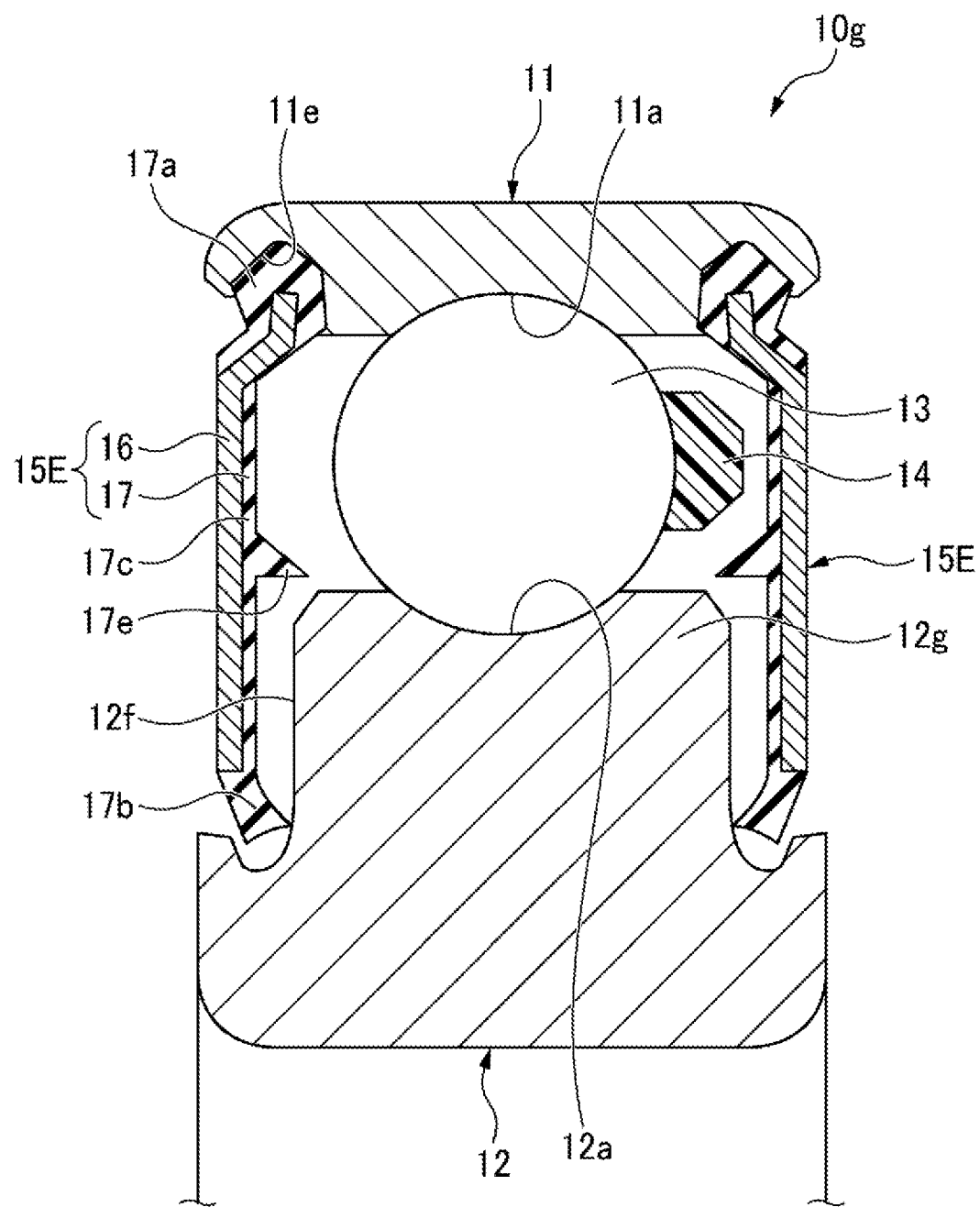
FIG. 10 is a cross-sectional view of an essential part of a deep groove ball bearing according to a seventh modification example.

As illustrated in FIG. 10, in a deep groove ball bearing 10g of a seventh modification example, the lip portion 17b of a seal member 15E comes into slide contact (inner contact) with the side surface 12f of the inner ring 12 from the axial outside. Since the lip portion 17b comes into inner contact with the side surface 12f of the inner ring 12, a contact surface pressure between the lip portion 17b and the side surface 12f can be appropriately maintained according to a direction in which a preload is applied to the deep groove ball bearing 10g. By using the seal member 15E, it is possible to effectively effect a sealing property depending on an air flow direction in the deep groove ball bearing 10g.

The seal member 15E may be provided only on one side in the axial direction, and the seal member 15 of the above-described embodiment that is an outer contact type may be provided on the other side in the axial direction.

Eighth Modification Example

Figure 11:
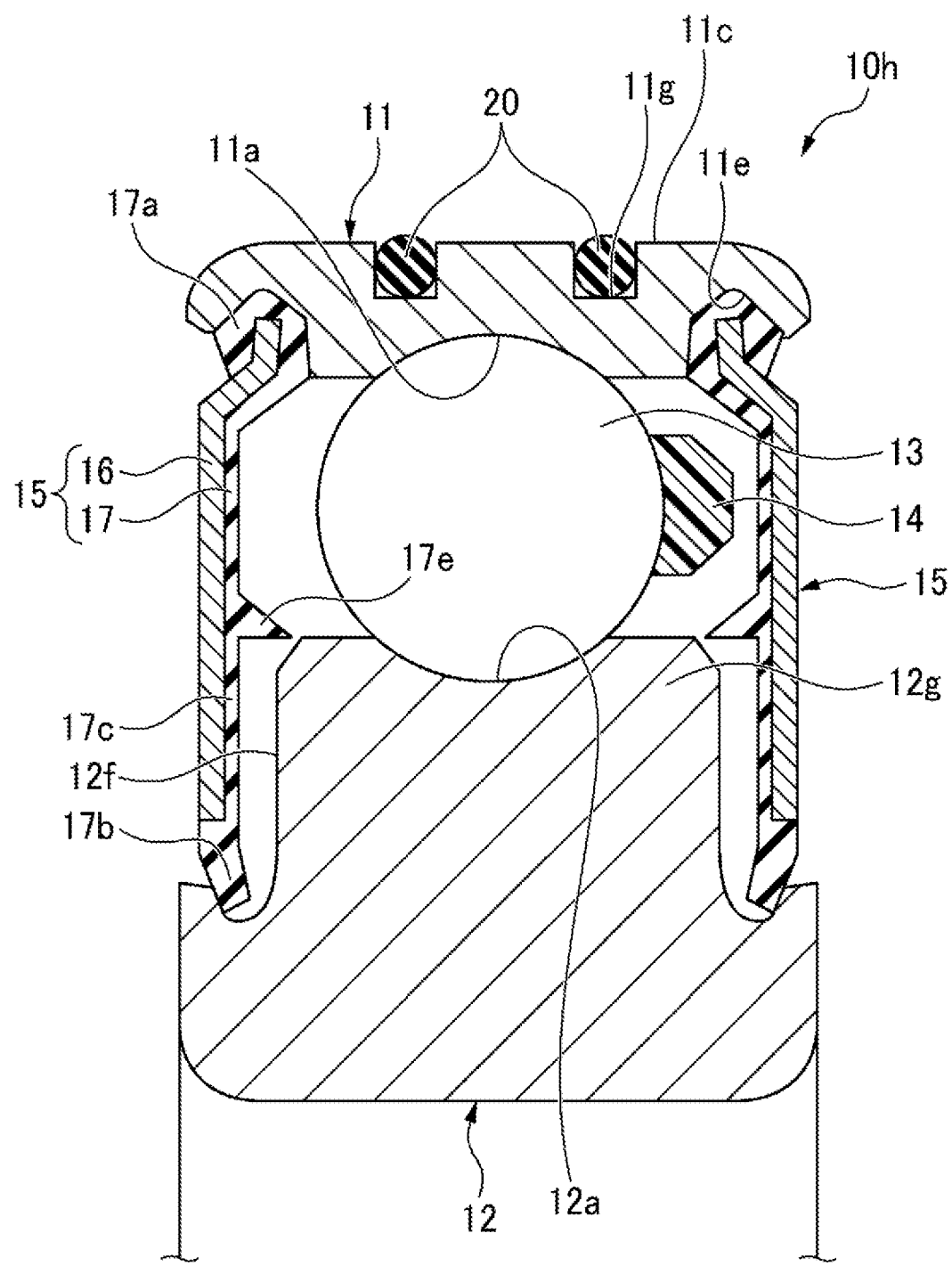
FIG. 11 is a cross-sectional view of an essential part of a deep groove ball bearing according to an eighth modification example.

As illustrated in FIG. 11, in a deep groove ball bearing 10h of an eighth modification example, two O-rings 20 are mounted in O-ring grooves 11g formed in the outer diameter surface 11c of the outer ring 11. The O-ring 20 prevents the outer ring 11 from creeping due to friction with a housing (not illustrated) in which the outer ring 11 is fitted.

Ninth Modification Example

Figure 12:
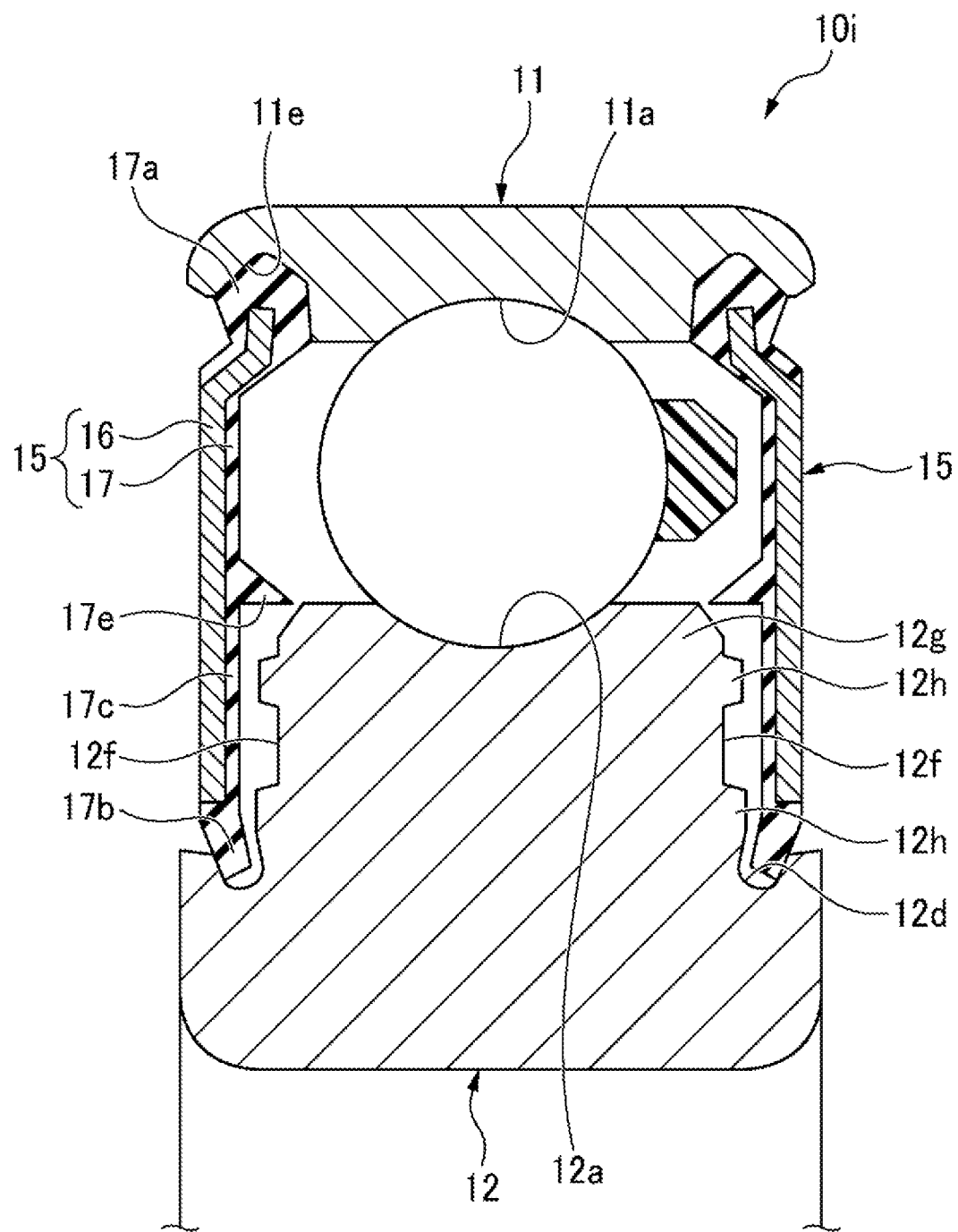
FIG. 12 is a cross-sectional view of an essential part of a deep groove ball bearing according to a ninth modification example.

As illustrated in FIG. 12, in a deep groove ball bearing 10i of a ninth modification example, the side surface 12f of the seal groove 12d of the inner ring 12 is provided with a plurality of protrusion portions 12h in an annular shape protruding in the axial direction. The plurality of protrusion portions 12h form a non-contact seal with the side portion 17c of the seal portion 17 to further prevent grease leakage.

Tenth Modification Example

Figure 13:
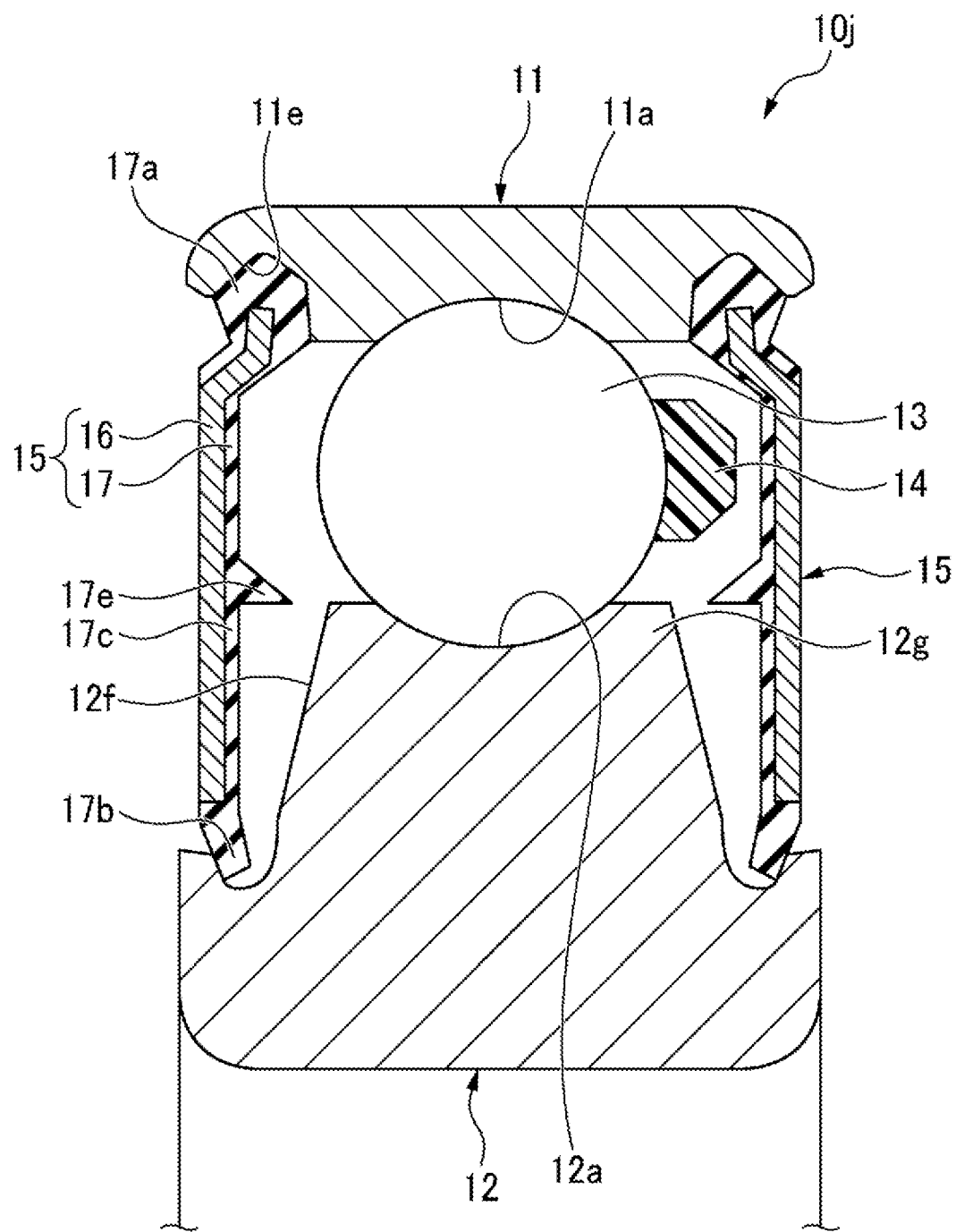
FIG. 13 is a cross-sectional view of an essential part of a deep groove ball bearing according to a tenth modification example.

As illustrated in FIG. 13, in a deep groove ball bearing 10j of a tenth modification example, the side surface 12f of the seal groove 12d of the inner ring 12 is formed to have a substantially trapezoidal cross-section of which an axial width narrows gradually radially outward. Thereby, workability of the inner ring 12 can be improved. By extending the auxiliary lip portion 17e illustrated in FIG. 12 to approach the inner ring 12, a gap between the auxiliary lip portion 17e and the inner ring 12 can be reduced to prevent grease leakage, which is preferable.

Eleventh Modification Example

Figure 14:
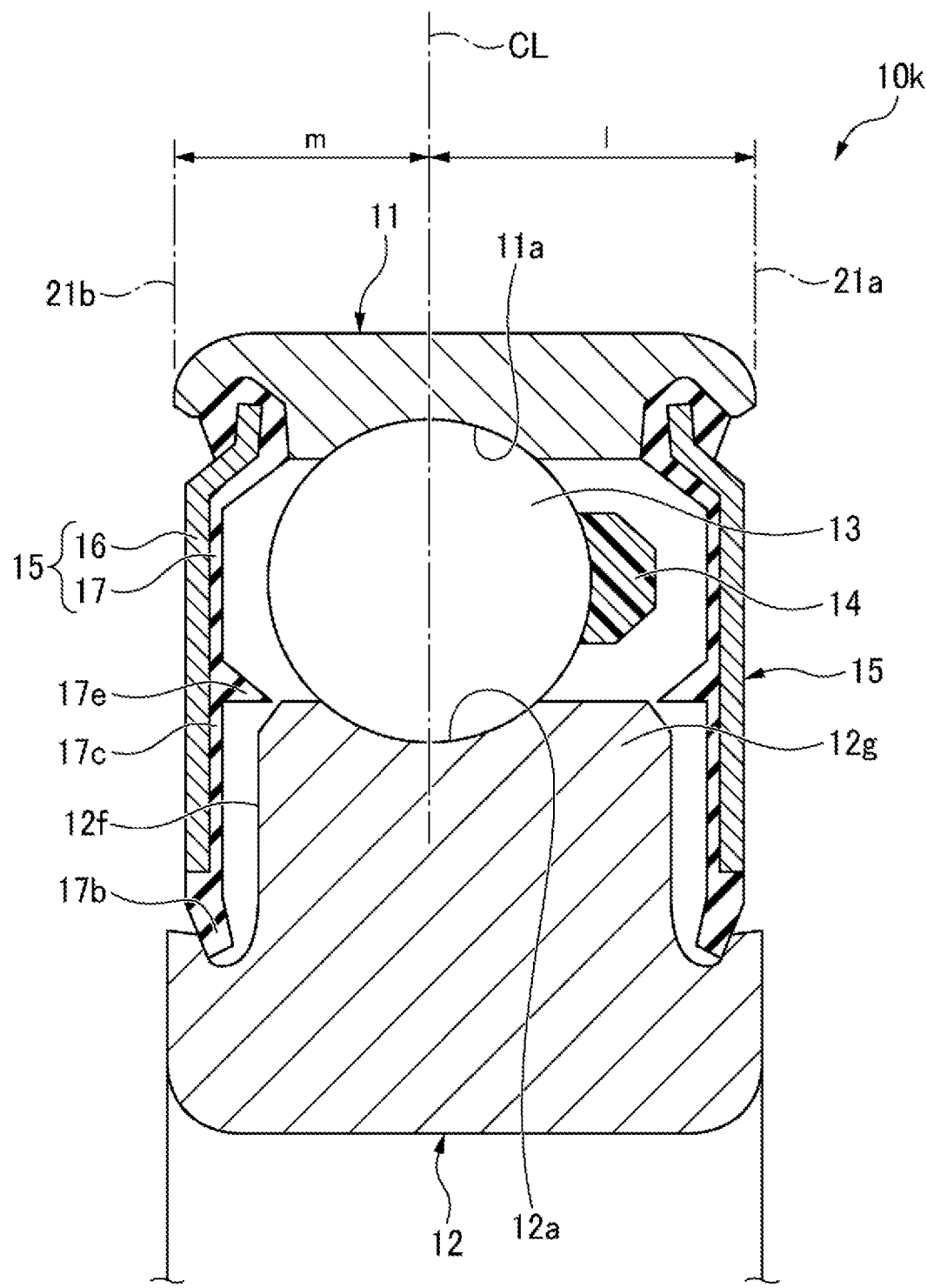
FIG. 14 is a cross-sectional view of an essential part of a deep groove ball bearing according to an eleventh modification example.

As illustrated in FIG. 14, in a deep groove ball bearing 10k of an eleventh modification example, the ball 13 is axially offset with respect to the outer ring 11 and the inner ring 12. Specifically, an axial dimension l from the axial centerline CL of the ball 13 to one end surface 21a of the deep groove ball bearing 10k is set larger than an axial dimension m from the axial centerline CL of the ball 13 to the other end surface 21b of the deep groove ball bearing 10k (l>m).

Therefore, on the one end surface 21a side where the axial dimension l from the axial centerline CL of the ball 13 to the one end surface 21a of the deep groove ball bearing 10k is set large, interference between the retainer 14 and the seal member 15 is less likely to occur. The axial dimension can be shortened on the other end surface 21b side where there is no risk of interference between the retainer 14 and the seal member 15, and thus the axial length of the deep groove ball bearing 10k is shortened.

Twelfth Modification Example

Figure 15:
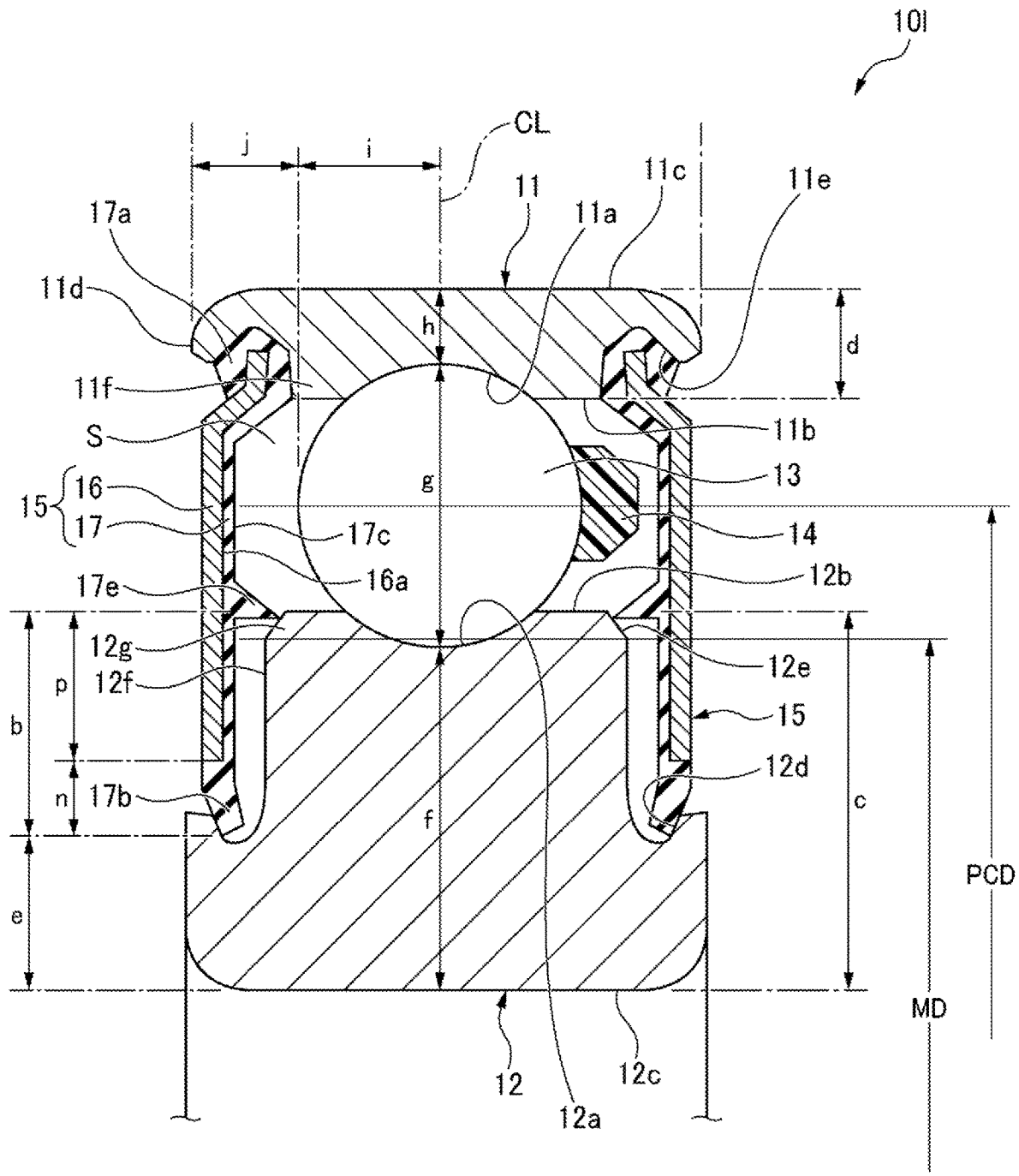
FIG. 15 is a cross-sectional view of an essential part of a deep groove ball bearing according to a twelfth modification example.

As illustrated in FIG. 15, in a deep groove ball bearing 10l of a twelfth modification example, the auxiliary lip portion 17e is formed in a radially intermediate portion of the side portion 17c of the seal portion 17 to protrude axially inward. The auxiliary lip portion 17e is in contact with the edge portion 12e between the outer diameter surface 12b of the shoulder portion 12g of the inner ring 12 and the side surface 12f of the seal groove 12d, forming a contact lip.

Therefore, since the seal member 15 includes the auxiliary lip portion 17e which is a contact lip on an upstream side of the labyrinth gap, outflow and evaporation of the grease and the base oil of the grease can be prevented, the service lifespan of the grease can be extended, and contamination of the surroundings can be prevented.

A contact point of the auxiliary lip portion 17e is not limited to the edge portion 12e of the inner ring 12, and may be the outer diameter surface 12b of the shoulder portion 12g near the edge portion 12e, or the side surface 12f of the seal groove 12d.

In the modification example, the seal member 15 includes the lip portion 17b in contact with the seal groove 12d, but may include a non-contact lip portion 17b disposed apart from the seal groove 12d.

Thirteenth Modification Example

Figure 16:
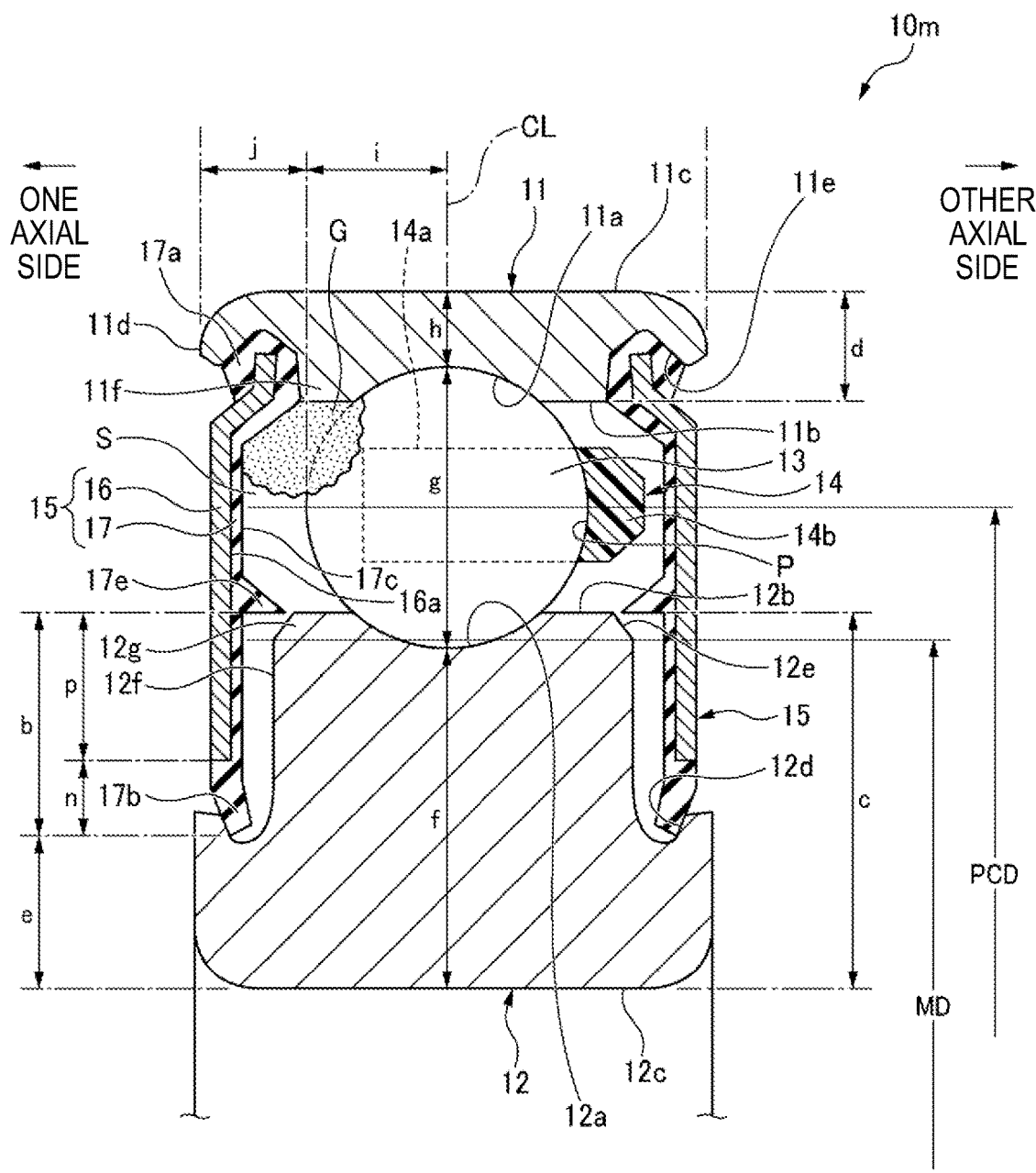
FIG. 16 is a cross-sectional view of an essential part of a deep groove ball bearing according to a thirteenth modification example.

As illustrated in FIG. 16, in a deep groove ball bearing 10m of a thirteenth modification example, the low dust generation grease G described above is enclosed in a space sealed by the seal member 15 in the deep groove ball bearing 10, that is, in the bearing space S surrounded by the seal member 15, the inner ring 12, the outer ring 11, and the ball 13.

Especially, the grease G is enclosed in the bearing space S on one axial side with respect to the axial centerline CL of the ball 13, which is an opening side of a pocket P of the crown-shaped retainer 14, preferably on an inner peripheral surface side of the outer ring 11.

Figure 17:
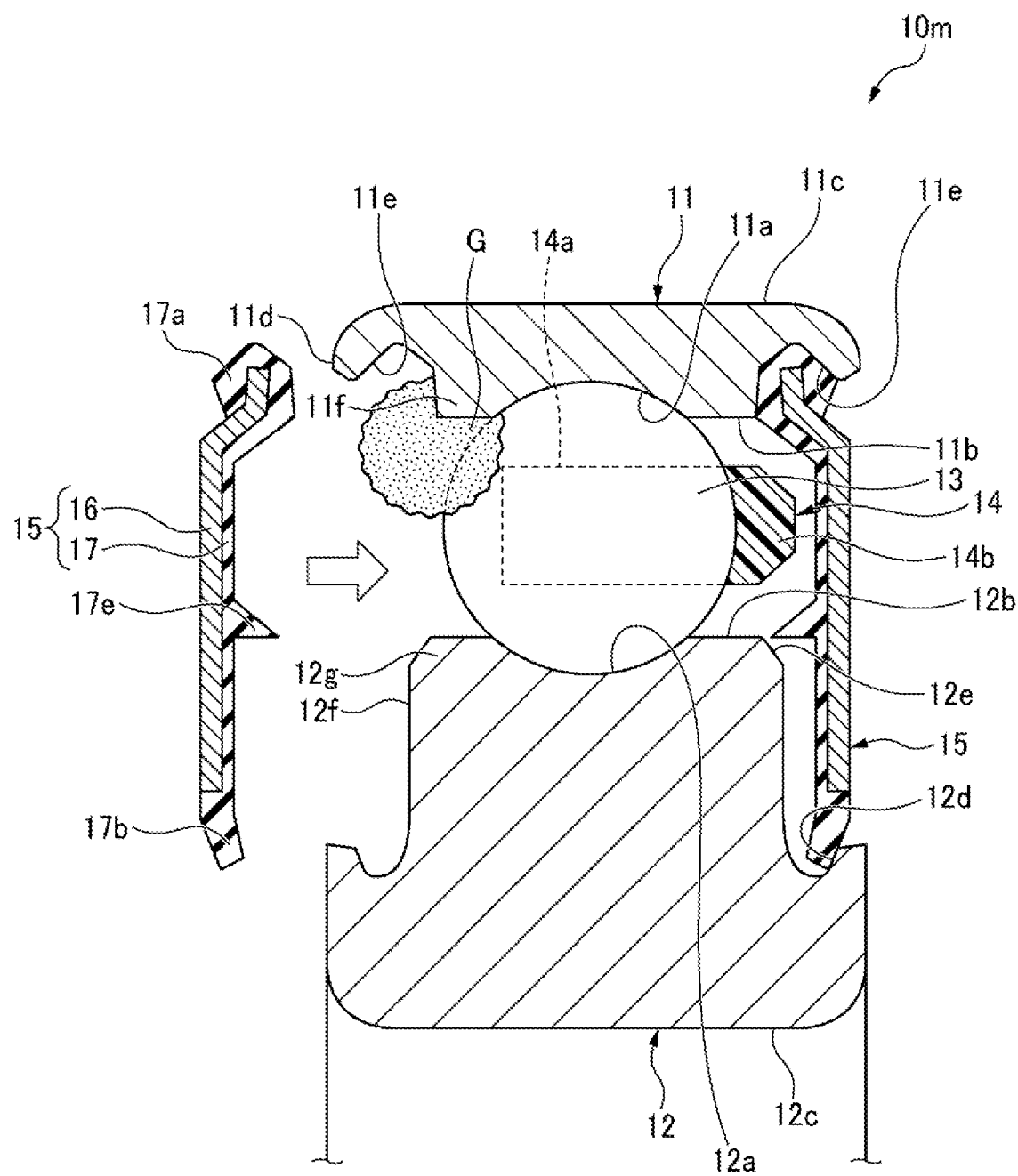
FIG. 17 is a cross-sectional view of an essential part illustrating processing of enclosing grease into the deep groove ball bearing of FIG. 16.

Specifically, as illustrated in FIG. 17, when the outer ring 11, the inner ring 12, the ball 13, the retainer 14, and the seal member 15 on the other axial side are assembled and before the seal member 15 on the one axial side is assembled, the grease G is enclosed by applying the grease G to the inner peripheral surface of the outer ring 11 from one axial side. Next, the seal member 15 on one axial side is attached to the seal attachment groove 11e of the outer ring 11.

When the grease G is enclosed, the seal member 15 on the other axial side is also removed, and after the grease G is enclosed, the pair of seal members 15 may be attached to the seal attachment grooves 11e of the outer ring.

In the present embodiment, the fact that the grease G is enclosed on one axial side, preferably on the inner peripheral surface side of the outer ring 11 means that in a state before running-in, the grease G is enclosed in a space area on one axial side with respect to the axial centerline CL of the ball 13 and on the inner peripheral surface side of the outer ring 11 with respect to the pitch diameter PCD of the ball. However, depending on the enclosing amount, enclosing the grease G described above includes a state where in the state before running-in, more grease G is enclosed on one axial side than on the other axial side with respect to the axial centerline CL of the ball 13, and more grease G is enclosed on the inner peripheral surface side of the outer ring 11 than on the outer peripheral surface side of the inner ring 12 with respect to the pitch diameter PCD of the ball.

As a result, the grease G can be easily enclosed in a space on the one axial side of the crown-shaped retainer 14 where an annular portion 14b is not provided. When the grease G is enclosed on the inner peripheral surface side of the outer ring, that is, away from a sealing position between the seal groove 12d of the inner ring 12 and the seal member 15, which separates the bearing space S from the outside, dust generation and leakage of grease can be prevented, and thus contamination to the surroundings can be prevented.

When the grease G is enclosed in the inner peripheral surface side of the outer ring 11, which is a stationary ring, the amount of grease that adheres to the ball 13 and is agitated during operation of the bearing is small, and thus a sudden rise in temperature can be prevented.

Figure 18:
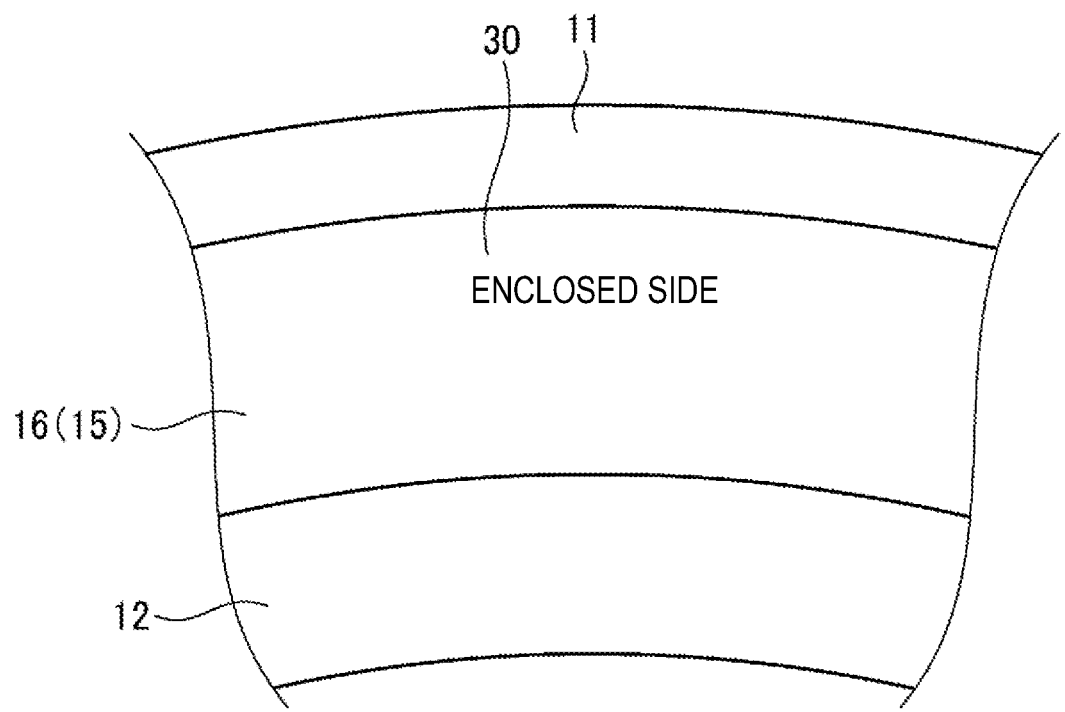
FIG. 18 is a side view of an essential part of a deep groove ball bearing viewed from an axial one side.

The pair of seal members 15, 15 have different appearances, and the appearance of one of the seal members 15, 15 is capable of distinguishing between one side and the other side in the axial direction. Specifically, in the modification example, as illustrated in FIG. 18, on an axially outer side surface of the metal core 16 of the seal member 15 on one axial side, an identification mark 30 is provided, for example, in a shape of a part of the seal member 15 formed in a convex shape, and thus the seal member on one axial side has a different appearance from the seal member on the other axial side. The identification mark 30 is recognized as representing one axial side, which is the side where the grease is enclosed in advance.

As a result, it is possible to determine a grease enclosing direction from the appearance of the bearing, and it is possible to integrate the bearing into a device such as an encoder while managing an anti-contamination direction. That is, when incorporating the deep groove ball bearing 10 into the device, the deep groove ball bearing 10 is disposed such that the part affected by the grease, for example a disk with a slit in the case of an encoder, is located on the other axial side of the deep groove ball bearing 10.

By utilizing the axially outer side surface of the metal core, it is possible to easily form a distinctive appearance.

As a method of giving the seal member 15 a distinctive appearance, in addition to the above, the colors of the axially outer side surfaces of the seal members 15 may be designated to different colors. The shapes of the pair of seal members 15, 15 may be different from each other, or one of the seal members 15, 15 may consist of a metal core and an elastic material, while the other seal member 15 may consist of a shield. Alternatively, the seal on one side may be stamped.

The present invention is not limited to the above-described embodiment and modification examples, and can be modified, improved, or the like as appropriate.

For example, in the above-described embodiment and modification examples, the inner ring 12 and the outer ring 11 are usually subjected to heat treatment such as quenching and tempering to improve hardness. However, in the deep groove ball bearing of the present invention, the surface hardness of the inner ring 12 and the outer ring 11 can be further improved by changing the heat treatment to a carbonitriding treatment. The fatigue lifespan of the surfaces (inner ring raceway groove 12a and outer ring raceway groove 11a) of the inner ring 12 and the outer ring 11 can be improved. The carbonitriding treatment may be applied only to the inner ring 12.

When using the crown-shaped retainer 14 as in the present embodiment, the deep groove ball bearing may be asymmetrical in the axial direction, such as the seal members 15 being different on both sides in the axial direction, or depending on the positioning of parts (for example, an encoder) around the deep groove ball bearing, a direction of incorporation of the crown-shaped retainer 14 may be opposite to that illustrated in FIG. 1. That is, a side on which the annular portion of the crown-shaped retainer 14 is disposed may be set to an opposite side with respect to the ball 13. Here, the direction in which the grease is enclosed is also changed according to the change in the direction in which the retainer 14 is incorporated.

In the above-described embodiment, a crown-shaped retainer is used as the retainer, and the grease is enclosed from one axial side, which is the opening side of the pocket. However, the retainer of the present invention is not limited to a crown-shaped retainer, and may be a retainer provided with annular portions on both sides in the axial direction, such as a corrugated retainer. Here, the grease may be enclosed with one of the axial sides as the one axial side.

As described above, the specification discloses the following matters.

(1) A deep groove ball bearing that includes:
an outer ring with an outer ring raceway groove on an inner diameter surface;
an inner ring with an inner ring raceway groove on an outer diameter surface;
a plurality of balls rollably arranged between the outer ring raceway groove and the inner ring raceway groove; and
a seal member fixed to the outer ring and disposed in contact or non-contact with a seal groove formed in a shoulder portion of the inner ring to seal a space between the outer ring and the inner ring, where an axial cross-sectional width is smaller than a radial cross-sectional height, a thickness of the inner ring is greater than a thickness of the outer ring, a pitch diameter of the ball is larger than a median diameter between an inner diameter of the inner ring and an outer diameter of the outer ring, and a radial dimension between an outer diameter of a shoulder portion of the inner ring and an inner diameter of the seal member is greater than the thickness of the outer ring.

According to such configuration, the axial cross-sectional width can be made smaller than the radial cross-sectional height, so that the width and weight can be reduced. By increasing the pitch diameter, the number of balls can be increased, and the load capacity of the deep groove ball bearing can be ensured to extend the service lifespan. A radial overlap dimension between the inner ring and the seal member can be increased, which improves the sealing performance, prevents grease leakage, and extends the service lifespan of the deep groove ball bearing.

(2) The deep groove ball bearing according to (1), where
a space sealed by the seal member is enclosed with low dust generation grease, and
the low dust generation grease contains a base oil blended with at least one selected from a synthetic hydrocarbon oil and an ether oil, a thickener composed of a urea compound, and an additive consisting only of nonmetallic element, and has an amount of metal elements mixed of 30 ppm or less.

According to such configuration, since the predetermined low dust generation grease is enclosed in the bearing space S sealed by the seal member 15, generation of dust can be prevented and contamination of the surroundings can be prevented. Since the low dust generation grease contains a urea compound as a thickener, high temperature properties of the grease can be improved.

(3) The deep groove ball bearing according to (2), where
the base oil has a kinematic viscosity of 30 mm²/sec to 180 mm²/sec at 40° C., a content of the additive is 0.1% by weight to 1% by weight of a total amount of the low dust generation grease, and a worked penetration of the low dust generation grease is 190 to 230.

According to such configuration, by specifying the kinematic viscosity of the base oil, it is possible to improve flow characteristics and lubricating performance of the low dust generation grease, and by controlling the content of the additive and the worked penetration of the low dust generation grease, even better low dust generating properties can be obtained.

(4) The deep groove ball bearing according to (2) or (3), where
the additive consisting only of nonmetallic elements is a carboxylic acid and derivatives thereof, a nonionic surfactant, an amine-based antioxidant, a phenol-based antioxidant, a long-chain fatty acid-based oily agent, benzotriazole-based metal deactivator, or a mixture thereof.

According to such configuration, the additive can act as a rust inhibitor, an antioxidant, an oiliness agent, or a metal deactivator.

(5) The deep groove ball bearing according to any one of (1) to (4), where
an amount of the grease enclosed in the space is 15% to 25% of a volume of the space.

According to such configuration, the amount of the grease enclosed in the space is 15% to 25% of the volume of the space. Therefore, dust generation and leakage of the grease can be prevented while ensuring the service lifespan of the grease such that the service lifespan of the bearing can be prolonged and contamination to the surroundings can be prevented.

(6) The deep groove ball bearing according to any one of (1) to (5), where
the seal member includes an auxiliary lip portion that protrudes axially inward and comes into contact with an edge portion between an outer diameter surface of a shoulder portion of the inner ring and a side surface of the seal groove or a vicinity of the edge portion.

According to such configuration, since the auxiliary lip portion that forms a contact seal is provided, it is possible to prevent outflow and evaporation of the grease and the base oil of the grease, thereby preventing contamination of the surroundings.

(7) The deep groove ball bearing according to any one of (1) to (6), further including:
a crown-shaped retainer including a plurality of pockets each open on one axial side and holding the plurality of balls respectively, where
The grease is enclosed on one axial side of the space.

According to such configuration, since the grease is enclosed on one axial side, it is possible to prevent dust generation and leakage of the grease from the other axial side, thereby preventing contamination of the surroundings.

(8) The deep groove ball bearing according to (7), where
the grease is enclosed on an inner peripheral surface side of the outer ring.

According to such configuration, dust generation and leakage of the grease can be further prevented.

(9) The deep groove ball bearing according to any one of (1) to (8), where
the grease is enclosed in one axial side of the space, and a pair of the seal members fixed to both sides of the outer ring in an axial direction have different appearances, and the appearance of either one of the seal members is capable of distinguishing between one side and the other side in the axial direction.

According to such configuration, the appearance of either one of the seal members is capable of distinguishing between the one side where the grease is enclosed and the other side in the axial direction. Therefore, it is possible to determine a grease enclosing direction from the bearing appearance and incorporate the bearing into a device while managing an anti-contamination direction.

(10) The deep groove ball bearing according to any one of (1) to (9), where
the seal member includes a metal core and a seal portion made of an elastic material covering the metal core, and the metal core is disposed axially outward from the seal portion.

According to such configuration, the metal core can effectively prevent leakage of the enclosed low dust generation grease.

Although the present disclosure is described in detail and with reference to specific embodiments, it will be apparent to those skilled in the art that various changes and modifications can be made without departing from the spirit and scope of the disclosure.

REFERENCE SIGNS LIST

10: deep groove ball bearing
11: outer ring
11a: outer ring raceway groove 12: inner ring
12a: inner ring raceway groove
13, 13A: ball
15, 15A, 15B, 15C, 15D, 15E: seal member
16: metal core
17: seal portion
17b: lip portion
17e: auxiliary lip portion
S: bearing space
b: radial dimension between outer diameter of inner ring and inner diameter of seal member
c: thickness of inner ring
d: thickness of outer ring
G: grease
MD: median diameter between inner diameter of inner ring and outer diameter of outer ring
PCD: pitch diameter

The invention claimed is:

1. A deep groove ball bearing that comprises:
an outer ring with an outer ring raceway groove on an inner diameter surface;
an inner ring with an inner ring raceway groove on an outer diameter surface;
a plurality of balls rollably arranged between the outer ring raceway groove and the inner ring raceway groove; and
a seal member fixed to the outer ring and disposed in contact or non-contact with a seal groove formed in a shoulder portion of the inner ring to seal a space between the outer ring and the inner ring, wherein:
an axial cross-sectional width of the deep groove ball bearing is smaller than a radial cross-sectional height of the deep groove ball bearing;
a thickness of the inner ring is greater than a thickness of the outer ring;
a pitch diameter of the ball is larger than a median diameter between an inner diameter of the inner ring and an outer diameter of the outer ring; and
a radial dimension between an outer diameter of the shoulder portion of the inner ring and an inner diameter of the seal member is greater than the thickness of the outer ring.

2. The deep groove ball bearing according to claim 1, wherein:
a space sealed by the seal member is enclosed with low dust generation grease; and
the low dust generation grease contains a base oil blended with at least one selected from a synthetic hydrocarbon oil and an ether oil, a thickener composed of a urea compound,
and an additive consisting only of non-metallic element, and has an amount of metal elements mixed of 30 ppm or less.

3. The deep groove ball bearing according to claim 2, wherein
the base oil has a kinematic viscosity of 30 mm$^2$/sec to 180 mm$^2$/sec at 40° C., a content of the additive is 0.1% by weight to 1% by weight of a total amount of the low dust generation grease, and a worked penetration of the low dust generation grease is 190 to 230.

4. The deep groove ball bearing according to claim 2, wherein
the additive consisting only of nonmetallic elements is a carboxylic acid and derivatives thereof, a nonionic surfactant, an amine-based antioxidant, a phenol-based antioxidant, a long-chain fatty acid-based oily agent, benzotriazole-based metal deactivator, or a mixture thereof.

5. The deep groove ball bearing according to claim 1, wherein
an amount of the grease enclosed in the space is 15% to 25% of a volume of the space.

6. The deep groove ball bearing according to claim 1, wherein
the seal member includes an auxiliary lip portion that protrudes axially inward and comes into contact with an edge portion between an outer diameter surface of the shoulder portion of the inner ring and a side surface of the seal groove or a vicinity of the edge portion.

7. The deep groove ball bearing according to claim 1, further comprising:
a crown-shaped retainer including a plurality of pockets each open on one axial side and holding the plurality of balls respectively, wherein
the grease is enclosed on one axial side of the space.

8. The deep groove ball bearing according to claim 7, wherein
the grease is enclosed on an inner peripheral surface side of the outer ring.

9. The deep groove ball bearing according to claim 1, wherein:
the grease is enclosed in one axial side of the space; and
a pair of the seal members fixed to both sides of the outer ring in an axial direction have different appearances, and the appearance of either one of the seal members is distinguishable between one side and the other side in the axial direction.

10. The deep groove ball bearing according to claim 1, wherein:
the seal member includes a metal core and a seal portion made of an elastic material covering the metal core; and
the metal core is disposed axially outward from the seal portion.

* * * * *